(12) United States Patent
Uemura et al.

(10) Patent No.: US 10,221,338 B2
(45) Date of Patent: *Mar. 5, 2019

(54) ADHESIVE SHEET

(71) Applicant: LINTEC CORPORATION, Itabashi-ku (JP)

(72) Inventors: Kazue Uemura, Tsukubamirai (JP); Kiichiro Kato, Saitama (JP); Yumiko Amino, Funabashi (JP); Shigeru Saito, Ina-machi (JP); Masaru Matsushima, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 44 days.

This patent is subject to a terminal disclaimer.

(21) Appl. No.: 15/300,119

(22) PCT Filed: Apr. 2, 2015

(86) PCT No.: PCT/JP2015/060417
§ 371 (c)(1),
(2) Date: Sep. 28, 2016

(87) PCT Pub. No.: WO2015/152351
PCT Pub. Date: Oct. 8, 2015

(65) Prior Publication Data
US 2017/0174946 A1    Jun. 22, 2017

(30) Foreign Application Priority Data

Apr. 2, 2014  (JP) .................................. 2014-076577
Apr. 2, 2014  (JP) .................................. 2014-076579
Apr. 2, 2014  (JP) .................................. 2014-076580

(51) Int. Cl.
*C09J 7/02*     (2006.01)
*B05D 5/00*     (2006.01)
(Continued)

(52) U.S. Cl.
CPC ................ *C09J 7/383* (2018.01); *B05D 1/36* (2013.01); *B05D 3/108* (2013.01); *B05D 5/00* (2013.01);
(Continued)

(58) Field of Classification Search
CPC ...... C09J 7/0217; C09J 11/04; C09J 2433/00; C09J 133/08; C09J 2201/606;
(Continued)

(56) References Cited

U.S. PATENT DOCUMENTS 6,294,250 B1    9/2001  Date
9,240,131 B2 *  1/2016  Onderisin .............. B31D 1/027
(Continued)

FOREIGN PATENT DOCUMENTS

DE    10 2008 026 951 A1    12/2009
EP        0 279 579 A1       8/1988
(Continued)

OTHER PUBLICATIONS

International Search Report dated Jun. 30, 2015, 2015 in PCT/JP2015/060417 filed Apr. 2, 2015.

*Primary Examiner* — Patricia L. Nordmeyer
(74) *Attorney, Agent, or Firm* — Oblon, McClelland, Maier & Neustadt, L.L.P.

(57) ABSTRACT

Provided is a pressure sensitive adhesive sheet containing a resin layer on a substrate or a release material, at least a surface (α) of the resin layer being opposite to the side thereof on which the substrate or the release material is provided having pressure sensitive adhesiveness, wherein, when a smooth surface of a light transmissive adherend having a smooth surface is attached to the surface (α), one or more concave portion (G) not kept in contact with the smooth surface exist on the surface (α), and the shapes of the one or more concave portions (G) have irregular shapes. The
(Continued)

pressure sensitive adhesive sheet has excellent air escape property capable of readily removing air accumulation that may be formed on attaching to an adherend, and has good pressure sensitive adhesion characteristics.

20 Claims, 8 Drawing Sheets

(51) Int. Cl.

| | |
|---|---|
| B05D 3/10 | (2006.01) |
| C09J 11/04 | (2006.01) |
| B05D 1/36 | (2006.01) |
| C09J 7/38 | (2018.01) |
| C09J 201/00 | (2006.01) |
| C09J 133/08 | (2006.01) |
| C08K 3/34 | (2006.01) |
| C09J 5/00 | (2006.01) |
| C09J 7/22 | (2018.01) |
| C09J 7/20 | (2018.01) |
| C09J 7/25 | (2018.01) |
| C09J 7/10 | (2018.01) |
| C09J 121/00 | (2006.01) |
| C09J 167/00 | (2006.01) |
| C09J 175/04 | (2006.01) |
| C08K 3/013 | (2018.01) |
| C08K 3/36 | (2006.01) |
| C08K 7/00 | (2006.01) |

(52) U.S. Cl.
CPC .................. *C08K 3/34* (2013.01); *C09J 5/00* (2013.01); *C09J 7/026* (2013.01); *C09J 7/0207* (2013.01); *C09J 7/0217* (2013.01); *C09J 7/0253* (2013.01); *C09J 7/0285* (2013.01); *C09J 7/10* (2018.01); *C09J 7/203* (2018.01); *C09J 7/22* (2018.01); *C09J 7/255* (2018.01); *C09J 7/38* (2018.01); *C09J 7/385* (2018.01); *C09J 11/04* (2013.01); *C09J 121/00* (2013.01); *C09J 133/08* (2013.01); *C09J 167/00* (2013.01); *C09J 175/04* (2013.01); *C09J 201/00* (2013.01); *C08K 3/013* (2018.01); *C08K 3/346* (2013.01); *C08K 3/36* (2013.01); *C08K 7/00* (2013.01); *C08K 2201/003* (2013.01); *C09J 7/02* (2013.01); *C09J 7/20* (2018.01); *C09J 2201/16* (2013.01); *C09J 2201/28* (2013.01); *C09J 2201/36* (2013.01); *C09J 2201/606* (2013.01); *C09J 2205/10* (2013.01); *C09J 2205/102* (2013.01); *C09J 2205/114* (2013.01); *C09J 2400/163* (2013.01); *C09J 2421/00* (2013.01); *C09J 2433/00* (2013.01); *C09J 2467/006* (2013.01); *C09J 2475/00* (2013.01); *C09J 2483/005* (2013.01)

(58) Field of Classification Search
CPC .... C09J 2201/28; C09J 2205/102; C09J 5/00; C09J 201/00; C09J 2201/16; C09J 2201/36; C09J 2205/10; C09J 2205/114; C09J 2400/163; C09J 2421/00; C09J 2467/006; C09J 2475/00; C09J 2483/005; C09J 7/02; C09J 7/385; C09J 7/255; C09J 7/203; C09J 7/22; C09J 7/38; C09J 7/10; C09J 7/0207; C09J 7/0253; C09J 7/026; C09J 7/0285; B05D 1/36; B05D 3/108; B05D 5/00; C08K 3/346; C08K 3/36; C08K 3/34; C08K 3/013; C08K 7/00; C08K 2201/003

See application file for complete search history.

(56) References Cited

U.S. PATENT DOCUMENTS

| | | | |
|---|---|---|---|
| 2001/0051264 | A1 | 12/2001 | Mazurek et al. |
| 2007/0004065 | A1 | 1/2007 | Schardt et al. |
| 2007/0212964 | A1* | 9/2007 | Massow .................. C08L 21/00 |
| | | | 442/151 |
| 2007/0275203 | A1 | 11/2007 | Ludwig |
| 2009/0047500 | A1 | 2/2009 | Maeda |
| 2010/0092730 | A1 | 4/2010 | Tomino et al. |
| 2010/0209671 | A1 | 8/2010 | Kato |
| 2011/0014462 | A1 | 1/2011 | Kanda |
| 2013/0011670 | A1* | 1/2013 | Tsubaki ................ C08L 23/283 |
| | | | 428/353 |
| 2015/0247064 | A1 | 9/2015 | Kato et al. |

FOREIGN PATENT DOCUMENTS

| | | |
|---|---|---|
| EP | 3 127 978 A1 | 2/2017 |
| EP | 3 127 982 A1 | 2/2017 |
| JP | 7-53930 A | 2/1995 |
| JP | 2001-507732 A | 6/2001 |
| JP | 2002-275433 A | 9/2002 |
| JP | 2004-115766 A | 4/2004 |
| JP | 2006-130672 A | 5/2006 |
| JP | 2008-150431 A | 7/2008 |
| JP | 2009-35609 A | 2/2009 |
| JP | 2009-231413 A | 10/2009 |
| JP | 2010-106239 A | 5/2010 |
| JP | 2011-12198 A | 1/2011 |
| JP | 2011-236370 A | 11/2011 |
| JP | 2012-13671 | 7/2012 |
| JP | 2012-197332 A | 10/2012 |
| JP | 2012-201877 A | 10/2012 |
| WO | WO 98/08909 A1 | 3/1998 |
| WO | WO 2007/079919 A1 | 7/2007 |

* cited by examiner (a)

(b)

(a)

(b)

(a)

(b)

ADHESIVE SHEET

TECHNICAL FIELD

The present invention relates to a pressure sensitive adhesive sheet. Precisely, the invention relates to a pressure sensitive adhesive sheet having excellent air escape property and having good pressure sensitive adhesion characteristics.

BACKGROUND ART

A general pressure sensitive adhesive sheet is constituted by a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by making the pressure sensitive adhesive layer into contact therewith.

A pressure sensitive adhesive sheet having a large attaching area, which may be used for identification or decoration, masking for painting, surface protection of a metal plate or the like, and the like, has a problem that on attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a particular shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, the pressure sensitive adhesive sheet having a pressure sensitive adhesive layer having grooves with a particular shape disposed in a prescribed pattern, as shown in PTL 1, has a problem that when the width of the grooves is small, it is difficult to vent the air, and when the width of the grooves is large, not only the surface of the substrate is dented to deteriorate the appearance, but also the pressure sensitive adhesive strength is lowered.

In the pressure sensitive adhesive sheet, the grooves disposed in a prescribed pattern deteriorate the pressure sensitive adhesive strength locally in the portion having the grooves disposed, and after attaching the pressure sensitive adhesive sheet to an adherend, there is a possibility that the sheet is detached therefrom in the portion.

In the case where the pressure sensitive adhesive sheet is attached to an adherend and then peeled again therefrom, there is a possibility of adhesive deposits remaining on the adherend depending on the peeling direction of the pressure sensitive adhesive sheet since the pressure sensitive adhesion characteristics of the pressure sensitive adhesive sheet varies locally. For example, in the case where the pressure sensitive adhesive sheet having the pressure sensitive adhesive layer wherein the grooves of a lattice pattern is disposed is peeled obliquely, there is a possibility of adhesive deposits remaining on the adherend.

Furthermore, in the case where the pressure sensitive adhesive sheet is punched out, there is a possibility that the disposition pattern of the grooves overlaps the punching pattern. In this case, the cutting depth may fluctuate to provide a problem that a cut line cannot be suitably formed in the pressure sensitive adhesive sheet.

In general, such a process step of forming a trigger for peeling in order to facilitate the peeling of the release material (i.e., a so-called back slit) by only cutting a release material provided on the pressure sensitive adhesive sheet may be performed. In the case where the above step is performed, it is the general procedure that the release material is once peeled off from the pressure sensitive adhesive sheet, and after putting notches in the release material, the release material and the pressure sensitive adhesive layer of the pressure sensitive adhesive sheet are again laminated with each other.

In the pressure sensitive adhesive sheet described in PTL 1, however, due to the use of an embossed liner as the release material, it is necessary to provide a separate release material that is not embossed. Because, it is difficult to follow to the emboss pattern of the release material when laminating again the release material and the pressure sensitive adhesive layer.

In PTL 1, further, for forming a minute structure in the pressure sensitive adhesive layer, such a method is used that the pressure sensitive adhesive layer is once formed by coating a pressure sensitive adhesive on the embossed liner, and then the pressure sensitive adhesive layer and a substrate are laminated (i.e., a so-called transfer coating method). However, in the case where a substrate having a surface with low polarity, such as a polyolefin substrate, is used, sufficient adhesiveness cannot be obtained between the substrate and the pressure sensitive adhesive layer by the method.

Moreover, as different from a release material formed of paper, a release material formed of a resin film is difficult to form a fine emboss pattern to a pressure sensitive adhesive layer.

In addition, the pressure sensitive adhesive sheet described in PTL 1 is inferior in blister resistance, and thus has a problem that blister is liable to occur in the case where the sheet is used at a high temperature.

An object of the present invention is to provide a pressure sensitive adhesive sheet which can readily remove air accumulation that may be formed on attaching to a light transmissive adherend, and therefore has excellent air escape property and good pressure sensitive adhesion characteristics.

Solution to Problem

The present inventors have found that a pressure sensitive adhesive sheet containing a resin layer, in which a surface ($\alpha$) of the resin layer has pressure sensitive adhesiveness and in which, when a smooth surface of a light transmissive adherend having a smooth surface is attached to the surface ($\alpha$), one or more concave portions not in contact with the smooth surface exist on the surface ($\alpha$) and the shapes of the one or more concave portions have irregular shapes, can solve the above-mentioned problems, and have completed the present invention.

Specifically, the present invention provides the following [1] to [15].

[1] A pressure sensitive adhesive sheet containing a resin layer on a substrate or a release material, at least a surface (α) of the resin layer being opposite to the side thereof on which the substrate or the release material is provided having pressure sensitive adhesiveness, wherein, when a smooth surface of a light transmissive adherend having a smooth surface is attached to the surface (α), one or more concave portions (G) not kept in contact with the smooth surface exist on the surface (α), and the shapes of the one or more concave portions (G) have irregular shapes.

[2] The pressure sensitive adhesive sheet according to the above [1], wherein the one or more concave portions (G) are formed through self-formation of the resin layer.

[3] The pressure sensitive adhesive sheet according to the above [1] or [2], wherein the areal ratio of the attached face that is in contact with the smooth surface is 10 to 95%.

[4] The pressure sensitive adhesive sheet according to any of the above [1] to [3], wherein the irregular shape of the concave portion (G) is visually confirmed.

[5] The pressure sensitive adhesive sheet according to any of the above [1] to [4], wherein the surface (α) has thereon the plural concave portions (G).

[6] The pressure sensitive adhesive sheet according to any of the above [1] to [5], wherein the concave portions (G) exist irregularly on the surface (α).

[7] The pressure sensitive adhesive sheet according to the above [5] or [6], wherein the positions of the plural concave portions (G) have no periodicity.

[8] The pressure sensitive adhesive sheet according to any of the above [1] to [7], wherein, when a smooth surface of a light transmissive adherend having a smooth surface is attached to the surface (α), the shape of the attached face that is in contact with the smooth surface has an irregular shape.

[9] The pressure sensitive adhesive sheet according to any of the above [1] to [8], wherein the resin layer contains a resin part (X) containing a resin as a main component and a particle part (Y) consisting of fine particles.

[10] The pressure sensitive adhesive sheet according to the above [9], wherein the resin part (X) contains at least one crosslinking agent selected from an epoxy crosslinking agent, an aziridine crosslinking agent and a metal chelate crosslinking agent.

[11] The pressure sensitive adhesive sheet according to the above [9] or [10], wherein the resin layer has a multi-layer structure containing a layer (Xβ) mainly containing the resin part (X), a layer (Y1) containing the particle part (Y) in an amount of 15% by mass or more, and a layer (Xα) mainly containing the resin part (X), as laminated in this order from the side on which the substrate or the release material is provided.

[12] The pressure sensitive adhesive sheet according to the above [11], wherein:

the layer (Xβ) is a layer formed by a composition (xβ) containing the resin as a main component, the layer (Y1) is a layer formed by a composition (y) containing the fine particles in an amount of 15% by mass or more, and the layer (Xα) is a layer formed by a composition (xα) containing the resin as a main component.

[13] A method for producing a pressure sensitive adhesive sheet according to any of the above [1] to [10], which includes at least the following steps (1) and (2):

step (1): a step of forming a coating film (x') formed by a composition (x) containing the resin as a main component, and a coating film (y') formed by a composition (y) containing the fine particles in an amount of 15% by mass or more; and step (2): a step of drying the coating film (x') and the coating film (y') formed in the step (1) simultaneously.

[14] The method for producing a pressure sensitive adhesive sheet according to the above [12], which includes at least the following steps (1B) and (2B):

step (1B): a step of forming, on a coating film (xβ) formed by the composition (x) containing the resin as a main component as provided on a substrate or a release material, a coating film (y') formed by the composition (y) formed by the fine particles in an amount of 15% by mass or more, and a step of forming a coating film (xα') formed by the composition (xα) containing the resin as a main component, by laminating in this order; and step (2B): a step of drying the coating film (y') and the coating film (xα') formed in the step (1B) simultaneously.

[15] The method for producing a pressure sensitive adhesive sheet according to the above [12], which includes at least the following steps (1B) and (2B):

step (1B): a step of forming, on the layer (Xβ) mainly containing a resin part (X) that is provided on a substrate or a release material, a coating film (y') formed by the composition (y) containing the fine particles in an amount of 15% by mass or more and a coating film (xα') formed by the composition (xα) containing the resin as a main component, by laminating in this order; and step (2B): a step of drying the coating film (y') and the coating film (xα') formed in the step (1B) simultaneously.

Advantageous Effects of Invention

The pressure sensitive adhesive sheet of the present invention has excellent air escape property capable of readily removing air accumulation that may be formed on attaching to a light transmissive adherend, and has good pressure sensitive adhesion characteristics.

DESCRIPTION OF EMBODIMENTS

Figure 1:
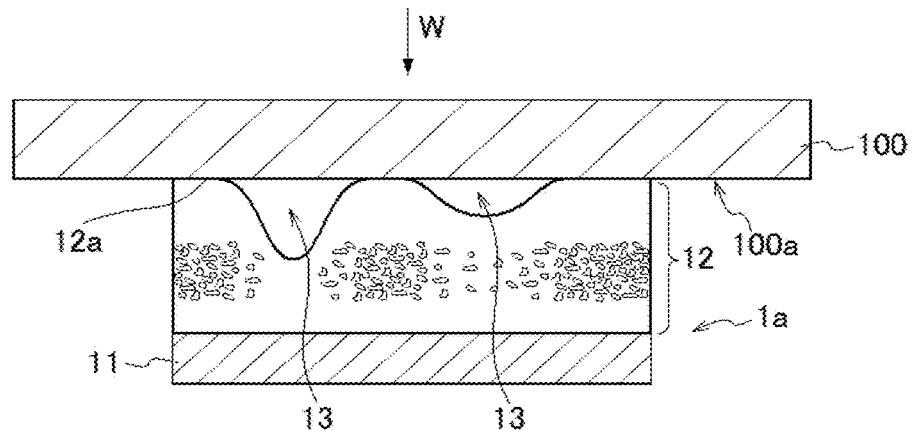
FIG. 1 is a schematic cross-sectional view of a pressure sensitive adhesive sheet, showing one example of a configuration where a surface (α) of the resin layer is attached to the smooth surface of a light transmissive adherend having a smooth surface.

In the present invention, for example, an expression "YY containing a component XX as a main component" or an expression "YY mainly containing a component XX" means that "among the components contained in YY, a component having a largest content is the component XX". A concrete content of the component XX in this expression is generally 50% by mass or more relative to the total amount (100% by mass) of YY, preferably 65 to 100% by mass, more preferably 75 to 100% by mass, even more preferably 85 to 100% by mass.

In the present invention, for example, "(meth)acrylic acid" indicates both "acrylic acid" and "methacrylic acid", and the same shall apply to other similarity terms.

Regarding a preferred numerical range (for example, a range of content or the like), a lower limit and an upper limit that are expressed in stages can be combined each independently. For example, from an expression of "preferably 10 to 90, more preferably 30 to 60", "the preferred lower limit (10)" and "the preferred upper limit (60)" may be combined to be "10 to 60".

FIG. 1 is a schematic cross-sectional view of a pressure sensitive adhesive sheet, showing one example of a configuration where a surface (α) of the resin layer is attached to the smooth surface of a light transmissive adherend having a smooth surface.

The resin layer 12 that the pressure sensitive adhesive sheet of the present invention has, as existing on the surface (α) 12a thereof, one or more concave portions (G) 13 not kept in contact with a smooth surface of a light transmissive adherend having a smooth surface, when the smooth surface of the adherend is attached to the surface (α) 12a.

The one or more concave portions (G) 13 play a role as an air-discharge channel for letting out "air accumulation" to form when the pressure sensitive adhesive sheet of the present invention is attached to an adherend. In a planar view of the one or more concave portions (G) 13 existing on the surface (α), the length of the one or more concave portions 13 is not specifically limited. Namely, the one or more concave portions (G) 13 include relatively long groove-like ones, and relatively short pit-like ones.

Figure 2:
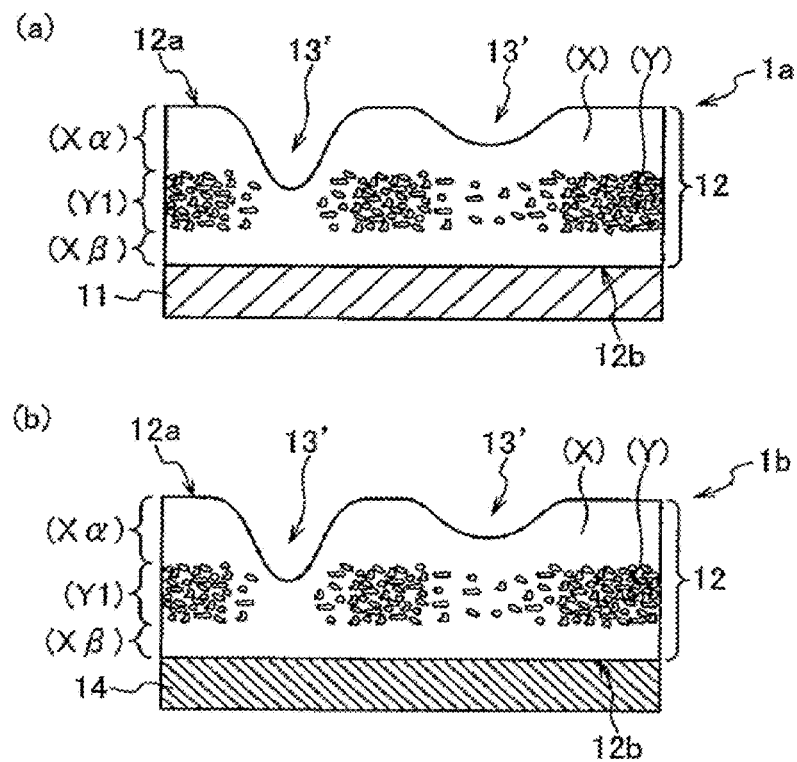
FIG. 2 is a schematic cross-sectional view of a pressure sensitive adhesive sheet of the present invention, showing examples of a configuration of the pressure sensitive adhesive sheet.

FIG. 2 shows examples of a configuration of a pressure sensitive adhesive sheet of the present invention before a light transmissive adherend is attached to the surface (α) 12. As shown in FIG. 2, one or more concave portions (g) 13' exist on the surface (α) 12a of the resin layer 12 that the pressure sensitive adhesive sheet of the present invention, before the light transmissive adherend is attached thereto.

Figure 3:
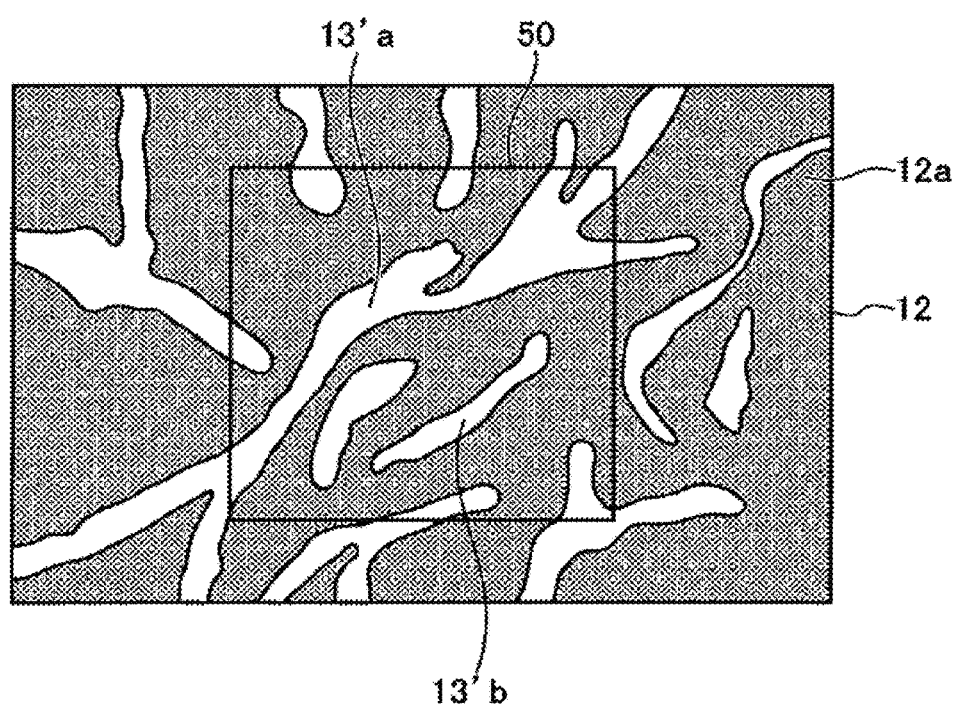
FIG. 3 is a schematic plan view of a surface (α) of the resin layer before a smooth surface of a light transmissive adherend having a smooth surface is attached to the surface (α) of the resin layer.

FIG. 3 is a schematic plan view of the surface (α) 12a of the resin layer before a smooth surface of a light transmissive adherend having a smooth surface is attached to the surface (α) 12a of the resin layer. For example, a region (Q) surrounded by a square 50 having an edge length of 1 mm that is arbitrarily selected on the surface (α) 12a of the resin layer in FIG. 2 is taken into consideration. In the region (Q), there exist one or more concave portions (g) 13'a having a relatively large height difference and one or more concave portions (g) 13'b having a relatively small height difference.

Figure 4:
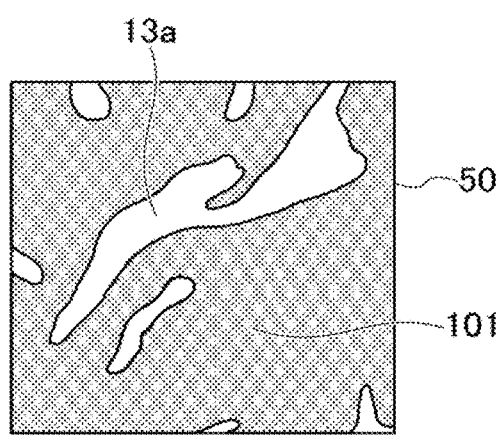
FIG. 4 is a schematic plan view of a surface (α) of the resin layer after a smooth surface of a light transmissive adherend having a smooth surface has been attached to the surface (α) of the resin layer.

FIG. 4 is a schematic plan view of the surface (α) 12a of the resin layer in FIG. 3, showing the surface (α) 12a of the resin layer in the region (Q) after a smooth surface of a light transmissive adherend having a smooth surface has been attached to the surface (α) 12a of the resin layer. FIG. 4 shows that the one or more concave portions (g) 13'b having a small height difference are kept in contact with the smooth surface of the adherend and deep one or more concave portions (g) 13'a are one or more concave portions (G) 13a not kept in contact with the smooth surface of the adherend.

Specifically, the schematic view of the region (Q) with a light transmissive adherend attached thereto as in FIG. 3 is compared with the region (Q) surrounded by the square 50 in FIG. 4. It is known that, for example, the one or more concave portions (g) 13'b having existed in FIG. 3 are one or more concave portions (g) having a small height difference and therefore in FIG. 4, these are kept in contact with the smooth surface of the adherend and do not exist as one or more concave portions (G) 13.

Accordingly, the one or more concave portions (G) 13a not kept in contact with the smooth surface of the adherend in FIG. 4 are smaller than the part occupied by the one or more concave portions (g) 13'a inside the region (Q) in FIG. 3. This is because, as described above, the surface (α) is adhesive, but when the surface (α) is attached to the light transmissive adherend, the one or more concave portions (g) having a relatively small height difference are also attached and kept in contact with the smooth surface of the light transmissive adherend.

In other words, the part occupied by the one or more concave portions (G) that are not in contact with the smooth surface of the light transmissive adherend after the smooth surface of the light transmissive adherend is attached does not always conform with the part occupied by the one or more concave portions (g) before the smooth surface of the light transmissive adherend is attached.

In FIG. 4, when the part occupied by the one or more concave portions (G) not in contact with the smooth surface of the light transmissive adherend is larger, it may be said that the effect of expressing the air escape property to let "air accumulation" outside could be higher.

In the present invention, the wording "the shapes of the one or more concave portions (G) have irregular shapes" means that in a planar view or a stereoscopic view of the shapes of the one or more concave portions (G), the shape thereof does not have any specific form such as a form surrounded by a circle or a line alone (circle, triangle, square, etc.) but has an irregular form with no similarities between the shapes of the individual concave portions (G).

For the judgement whether or not the shapes of the one or more concave portions (G) on the surface (α) have irregular shapes, the smooth surface of a light transmissive adherend having a smooth surface is attached to the surface (α) in a planar view, and the shapes of the one or more concave portions (G) not kept in contact with the smooth surface relative to the entire surface (α) are checked as to whether or not they have irregular shapes. When at least the planar shape of the one or more concave portions have irregular shapes, it is judged that the shapes of the one or more concave portions (G) have irregular shapes. Specifically, in principle, the shapes of the one or more concave portions (G) are three-dimensionally observed visually or via a digital microscope (magnification power: 30 to 100 times) for the judgement.

However, in the case where ten regions (R) each surrounded by a square having an edge length of 4 mm on the surface (α) to which the smooth surface of a light transmissive adherend having a smooth surface has been attached are selected and where the shapes of the one or more concave portions (G) existing inside each region (R) is observed visually or with a digital microscope (magnification power: 30 to 100 times) in a planar view (optionally in a stereoscopic view) from the side of the surface (α), when the shapes of the one or more concave portions (G) existing in every selected region are all judged to have irregular shapes, it may also be considered that "the shapes of the one or more concave portions (G) on the surface (α) of the resin layer have an irregular shape".

Regarding the pressure sensitive adhesive sheet of the present invention, "light transmissive adherend having a smooth surface" is to merely define the adherend in defining the pressure sensitive adhesive sheet in that the one or more concave portions (G) thereof not in contact with the smooth surface exist on the surface (α) of the resin layer and that the shapes of the one or more concave portions (G) have irregular shapes, and is not intended to define the adherend that may be the object to which the pressure sensitive adhesive sheet of the present invention is to be attached.

The adherend that may be the object to which the pressure sensitive adhesive sheet is to be attached is not specifically limited in point of the presence or absence of a smooth surface and in point of the presence or absence of translucency, and for example, it may be a light transmissive adhered having a curved surface.

The "smooth surface" of the "light transmissive adherend having a smooth surface" means a surface whose centerline mean roughness ($Ra_{75}$) defined in JIS B0601:2001 is 0.1 μm or less.

The "translucency" means a characteristic having a total light transmittance of 70% or more as measured according to JIS K7105.

The material for the light transmissive adherend is not specifically limited, but from the viewpoint of the ability to readily form the light transmissive adherend having a smooth surface as defined in the above and from the viewpoint of observing the adherend visually or with a digital microscope, the material is preferably glass.

Like the pressure sensitive adhesive sheet described in PTL 1, a pressure sensitive adhesive sheet having an adhesive layer with pre-designed determinate grooves formed on the surface thereof through embossed pattern transfer is known. In the pressure sensitive adhesive sheet of the type, the shapes of the grooves are determinate, and even though the shapes of the grooves are so planned as to improve at least one characteristic selected from air escape property, appearance, pressure sensitive adhesion characteristics and punching property, the other characteristics often worsen in many cases.

The present inventors have specifically noted that, for example, the shape of the grooves capable of contributing toward improving air escape property and the shape of the grooves capable of improving pressure sensitive adhesion characteristics differs from each other in point of the shape of the grooves that are required to improve the individual characteristics, and have found out the technical meaning of the presence of one or more concave portions (G) of irregular shapes on the surface (α) of the adhesive resin layer at the time when the smooth surface of a light transmissive adherend having a smooth surface is attached to the resin layer.

Namely, in the pressure sensitive adhesive sheet of the present invention, the one or more concave portions (G) existing on the surface (α) of the resin layer have irregular shapes when the smooth surface of a light transmissive adherend having a smooth surface is attached thereto, and such concave portions differing from each other in point of the degree of contribution toward various characteristics of air escape property, appearance, pressure sensitive adhesion characteristics and punching property are formed on that surface, and consequently, these characteristics of the pressure sensitive adhesive sheet can be thereby well balanced.

On the surface (α) 12a of the resin layer 12 that the pressure sensitive adhesive sheet of the present invention has, there exist one or more concave portions (g) before the light transmissive adherend is attached thereto. Preferably, the one or more concave portions (g) are formed through self-formation of the resin layer. Here, "self-formation" means a phenomenon of naturally forming a disorganized profile in a process of self-sustaining formation of a resin layer, and more precisely, means a phenomenon of naturally forming a disorganized profile in a process of self-sustaining formation of a resin layer by drying a coating film formed of a composition that is a forming material for a resin layer.

The shapes of the one or more concave portions (g) thus formed through self-formation of the resin layer in the manner as above may be controlled in some degree by controlling the drying condition or the kind and the content of the component in the composition that is a forming material for the resin layer, but differ from grooves to be formed through embossed pattern transfer, and it may be said that "it is substantially impossible to reproduce exactly the same shapes". Consequently, it may be said that the one or more concave portions (g) formed through self-formation of the resin layer can be said to have irregular shapes. The one or more concave portions (g) formed through self-formation differ from grooves formed through embossed pattern transfer. The one or more concave portions (G) on the surface (α) of the pressure sensitive adhesive sheet of the present invention are, when a light transmissive adherend is attached thereto, those that are not kept in contact with the smooth surface of the light transmissive adhered, and the one or more concave portions (G) are derived from the one or more concave portions (g). Accordingly, it is desirable that the one or more concave portions (G) on the surface (α) of the pressure sensitive adhesive sheet of the present invention are also those formed through self-formation of the resin layer.

The process of forming one or more concave portions (g) on the surface (α) of the resin layer that the pressure sensitive adhesive sheet of the present invention has is considered to be as follows.

First, during formation of a coating film of a composition that is a forming material for the resin layer, and in the step of drying the coating film, contraction stress develops inside the coating film, and in the part where the bonding force of the resin would have attenuated, the coating film is cracked inside. With that, it is considered that the resin around the cracked part may flow into the space temporarily formed by cracking to thereby form one or more concave portions (g) on the surface (α) of the resin layer.

It is considered that, when two coating films that differ in the resin content are formed and then the two coating films are dried simultaneously, a contraction stress difference could be generated inside the coating films being dried, and the coating films could be thereby readily cracked.

From the viewpoint of readily forming the one or more concave portions (g), it is recommended to control the condition appropriately in consideration of the following matters. It is considered that these matters could react with each other in a complex form to facilitate the formation of the one or more concave portions. In this connection, preferred embodiments of the matters for facilitating the formation of the one or more concave portions (g) are as described in the corresponding sections to be given hereinunder.

The kind, constituent monomers, molecular weight and content of the resin contained in the composition of the forming material for the coating film.

The kind of the crosslinking agent and the kind of the solvent contained in the composition of the forming material for the coating film.

The viscosity and the solid concentration of the composition of the forming material for the coating film.

The thickness of the coating film to be formed (when plural layers are formed, the thickness of each coating film).

The drying temperature and the drying time for the formed coating film.

In formation of the adhesive layer in an ordinary pressure sensitive adhesive sheet, it is intended to form the adhesive layer having a flat surface, and the above-mentioned matters are suitably settled in many cases.

On the other hand, in the present invention, the above matters are so settled that the one or more concave portions (g) capable of contributing toward improvement of the air escape property of the pressure sensitive adhesive sheet can be formed, quite differing from those in the planning method for the adhesive layer of ordinary pressure sensitive adhesive sheets.

Preferably, the above-mentioned matters are suitably settled in consideration of the flowability of the resin contained in the coating film to be formed.

For example, in the case where the composition contains fine particles, by controlling the viscosity of the coating film formed of a composition containing a large amount of fine particles to fall within a suitable range, it is possible to suitably prevent the formed coating film from being mixed with any other coating film (a coating film containing a large amount of resin) while the predetermined flowability of the fine particles in the coating film could be maintained as such. By such controlling, cracks could be readily formed in the horizontal direction to facilitate formation of one or more concave portions (g) in the coating film containing a large amount of resin.

As a result, it may be possible to increase the proportion of the one or more concave portions (g) to be formed on the surface (α) and to increase the proportion of the one or more concave portions connecting to each other, thereby giving a pressure sensitive adhesive sheet having a more superior air escape property.

Among the above-mentioned matters, it is desirable to suitably control the kind, the constituent monomers and the molecular weight of the resin and the resin content in the coating film so that the resin contained in the coating film containing a large amount of resin could have a suitable viscoelasticity.

Namely, by suitably increasing the hardness of the coating film (the hardness thereof that may be determined various factors such as the viscoelasticity of resin, the viscosity of the coating liquid, etc.), the contract stress of the resin part (X) increases to facilitate the formation of one or more concave portions (g). When the hardness of the coating film is higher, the contraction stress could be higher to facilitate the formation of one or more concave portions, but when the coating film is too hard, the coatability thereof may worsen. In addition, when the resin elasticity is increased too much, the adhesive strength of the resin layer to be formed from the coating film tends to lower. In consideration of these, it is desirable to suitably control the viscoelasticity of the resin.

In the case where the composition or the coating film contains fine particles, it is considered that, by making the dispersion condition of the fine particles appropriate, the degree of swelling of the thickness of the resin layer owing to the fine particles therein and the self-forming power of the one or more concave portions (g) could be thereby controlled and, as a result, the one or more concave portions (g) could be readily formed on the surface (α).

Further, in consideration of the crosslinking speed of the formed coating film (or the composition of the forming material), it is desirable that the above-mentioned matters are suitably settled.

Namely, in the case where the crosslinking speed of the coating film is too high, the coating film would be cured before formation of one or more concave portions (g)

therein. In addition, in the case, there may be some influences on the degree of cracking of the coating film.

The crosslinking speed of the coating film may be controlled by suitably defining the kind of the crosslinking agent and the kind of the solvent in the composition of the forming material or by suitably settling the drying time and the drying temperature for the coating film.

The one or more concave portions (G) on the surface ($\alpha$) of the pressure sensitive adhesive sheet of the present invention are, when a light transmissive adherend is attached thereto, one or more concave portions not kept in contact with the smooth surface of the light transmissive adherend, and these one or more concave portions (G) are derived from the one or more concave portions (g) as so described hereinabove.

One or more of the above concave portions (G) may exist on the surface ($\alpha$) of the resin layer 12, but in the pressure sensitive adhesive sheet of the present invention, it is desirable that plural concave portions (G) exist on that surface. Existence of one concave portion (G) on the surface ($\alpha$) means a case where all the concave portions (G) on the surface ($\alpha$) continue to each other to form uninterrupted concave portions (G).

For judgement on whether one or plural concave portions (G) exist, in principle, the surface ($\alpha$) of the resin layer is observed visually or with a digital microscope to judge it. However, as described above, 10 regions (R) each surrounded by a square having an edge length of 4 mm on the surface ($\alpha$) of the resin layer of the pressure sensitive adhesive sheet are arbitrarily selected, and whether one or plural concave portions exist inside each region (R) may be observed visually or with a digital microscope for the judgement.

Preferably, the one or more concave portions (G) exist irregularly on the surface ($\alpha$) Here, the wording "one or more concave portions (G) exist irregularly" means a state where the one or more concave portions (G) do not exist on the surface ($\alpha$) as a pre-designed form or in a predetermined pattern. Regarding a heretofore-known pressure sensitive adhesive sheet having, on the surface of the adhesive layer thereof, grooves as arranged in a predetermined pattern in a preplanned shape, even when at least one characteristic thereof selected from the air escape property, the outward appearance, the adhesive characteristic and the punching property is tried to be improved by the shape of the grooves and the arrangement of the grooves, the other characteristics of the sheet are worsened in many cases.

In the pressure sensitive adhesive sheet of the present invention, when the smooth surface of a light transmissive adherend having a smooth surface is attached to the surface ($\alpha$), it is desirable that the shape of the attached face that is kept in contact with the smooth surface has an irregular shape. In the pressure sensitive adhesive sheet of the present invention, when the smooth surface of a light transmissive adhesive having a smooth surface is attached to the surface ($\alpha$), the shapes of the concave portions (G) not in contact with the smooth surface have an irregular shape, and therefore, there is a high possibility that the shape of the attached face kept in contact with the smooth surface also has an irregular shape.

In the case where the pressure sensitive adhesive sheet of the present invention has plural concave portions (G), preferably, the positions of the plural concave portions (G) have no periodicity. In observing the entire surface ($\alpha$) of the resin layer, the grooves formed with an embossing roll or the like have certain periodicity. In the present invention, preferably, the grooves do not have such periodicity. For judgement of the periodicity, 10 regions (R) each surrounded by a square having an edge length of 4 mm are arbitrarily selected, and are observed visually or with a digital microscope (magnification power: 30 to 100 times).

When the smooth surface of a light transmissive adherend having a smooth surface is attached to the surface ($\alpha$) of the pressure sensitive adhesive sheet, the areal ratio of the attached face kept in contact with the smooth surface is preferably 10 to 95%, more preferably 20 to 93%, even more preferably 30 to 90%, still more preferably 40 to 75%, and most preferably 45 to 70%. When the areal ratio of the attached face falls within the above range, the pressure sensitive adhesive sheet can have excellent air escape property and have good pressure sensitive adhesion characteristics.

In the present invention, ten regions of "an arbitrarily selected region surrounded by a square of 1 to 10 mm on a side" on the surface ($\alpha$) are selected, a value of the areal ratio of the attached portion in each region is calculated according to the following operations (i) to (iii), and a mean value of the resultant data of the areal ratio of the attached portion can be considered as the "areal ratio of the attached portion of the surface ($\alpha$)" of the measured pressure sensitive adhesive sheet. More specifically, a mean value of the data of the areal ratio of the attached portion calculated according to the method described in the section of Examples can also be considered as the "areal ratio of the attached portion of the surface ($\alpha$)" of the measured pressure sensitive adhesive sheet.

Operation (i): As shown in FIG. 1, the pressure sensitive adhesive sheet to be measured is statically put on a smooth surface 100a of a light transmissive adherend 100 formed of glass or the like, in such a manner that the surface ($\alpha$) 12a of the resin layer 12 that the pressure sensitive adhesive sheet has could be in contact with the smooth surface 100a. With that, on the side of the substrate or the release material of the pressure sensitive adhesive sheet, a 2-kg roller (press application device defined in JIS Z 0237:2000 10.2.4) is run by 5 reciprocating motions to thereby adhere the surface ($\alpha$) 12a of the resin layer 12 and the smooth surface 100a of the light transmissive adherend 100. Accordingly, a laminate as arranged in the direction shown in FIG. 1 is obtained.

Operation (ii): On the side of the light transmissive adherend 100 of the laminate obtained in the operation (i), an interface between the smooth surface 100a of the light transmissive adherend 100 and the surface ($\alpha$) 12a of the resin layer in an arbitrarily selected region on the surface ($\alpha$) 12a is photographed in the direction W in FIG. 1, using a digital microscope, thereby giving a digital image of the selected region.

Operation (iii): Using image analysis software, the resultant digital image is processed (binarization) to give a binarized image. With that, on the binarized image, the area S of the attached portion that is in contact with the smooth surface of the light transmissive adherend in the total area of the selected region is determined. Next, based on a math formula "[areal ratio (%) of attached portion]=S/total area of selected region×100]", the areal ratio of the attached portion to the light transmissive adherend in the selected region is calculated.

The kind of the light transmissive adherend to be used for the measurement and specific methods of the operations (i) to (iii) are as described in the section of Examples.

[Configuration of Pressure Sensitive Adhesive Sheet]

Examples of a configuration of the pressure sensitive adhesive sheet of the present invention before a light transmissive adherend is attached thereto are described.

As shown by FIG. 2 (a) and FIG. 2 (b), the pressure sensitive adhesive sheet has one or more concave portions (g) 13' on the surface (α) 12a of the resin layer on the side opposite to the side on which the substrate 11 or the release material 14 is provided. The one or more concave portions (g) 13' existing on the surface (α) 12a play a role of air-discharge channels for removing outside the "air accumulation" to be formed in adhering the pressure sensitive adhesive sheet of the present invention to an adherend. The resin layer shown in FIG. 1 and FIG. 2 is one preferred embodiment of the pressure sensitive adhesive sheet of the present invention. The resin layer 12 is so designed as to include a resin part (X) and a particle part (Y) containing of fine particles.

In the pressure sensitive adhesive sheet of the present invention, at least the surface (α) 12a (hereinafter this may be simply referred to as "surface (α)") of the resin layer 12 on the side opposite to the side on which the substrate 11 or the release material 14 is provided has pressure sensitive adhesiveness.

Consequently, the pressure sensitive adhesive sheet 1a or 1b shown in FIG. 2 as embodiments of the pressure sensitive adhesive sheet of the present invention is, from the viewpoint of handleability, preferably so configured that a release material 14a is further provided on the surface (α) 12a of the resin layer 12.

In one embodiment of the pressure sensitive adhesive sheet of the present invention, the surface (β) 12b (hereinafter this may be simply referred to as "surface (β)") of the resin layer 12 on the side on which the substrate 11 or the release material 14 is provided may also have pressure sensitive adhesiveness. In the case where the surface (β) also has pressure sensitive adhesiveness in the pressure sensitive adhesive sheet 1a shown by FIG. 2(a), the adhesion between the resin layer 12 and the substrate 11 is bettered, and in the case, the pressure sensitive adhesive sheet 1b shown by FIG. 2(b) can be a double-sided pressure sensitive adhesive sheet.

[Regarding Concave Portions (g)]

Figure 5:
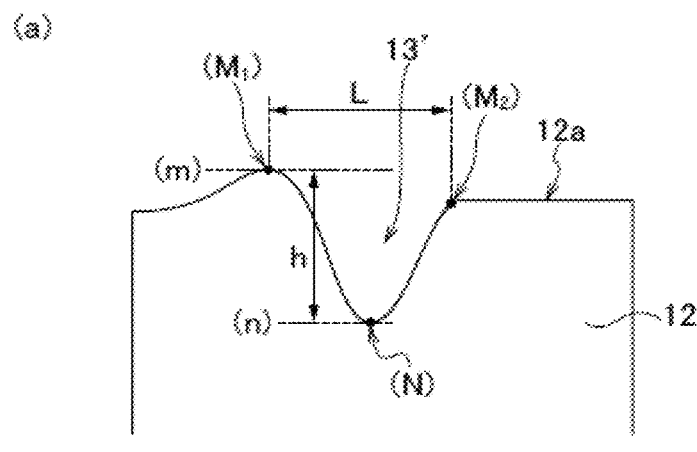
FIG. 5 is a schematic cross-sectional view of the resin layer of a pressure sensitive adhesive sheet of the present invention, showing examples of a shape on the side of the surface (α) of the resin layer before the smooth surface of a light transmissive adherend having a smooth surface is attached to the surface (α) of the resin layer.
Figure 5:
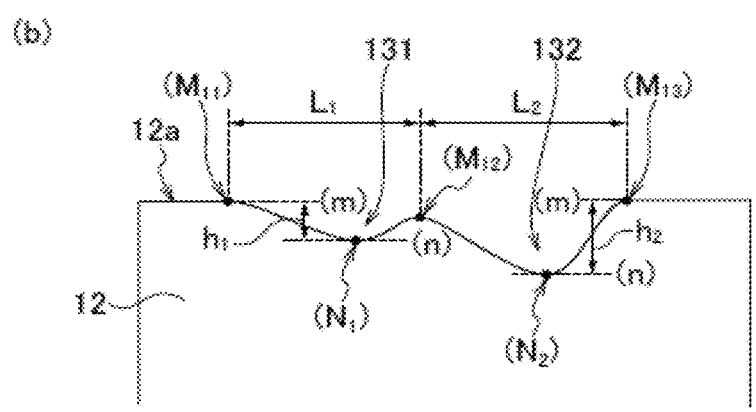

FIG. 5 includes schematic cross-sectional views of the resin layer of a pressure sensitive adhesive sheet of the present invention, showing examples of a shape on the side of the surface (α) of the resin layer before the smooth surface of a light transmissive adherend having a smooth surface is attached to the surface (α) of the resin layer.

Like the concave portion (g) 13' shown in FIG. 5(a), the shape of an ordinary concave portion (g) has two mountain parts ($M_1$) and ($M_2$) and a valley part (N). The "height difference" of the concave portion (g) in the present invention means the length of the difference (h) between the highest position (m) of the two mountain parts ($M_1$) and ($M_2$) (in FIG. 5(a), the maximum point of the mountain part ($M_1$)) and the lowest position (n) thereof (in FIG. 5(a), the minimum point of the valley part (N)), relative to the thickness direction of the resin layer 12.

It is considered that the case of FIG. 5(b) would have two concave portions of a concave portion (g) 131 having two mountain parts ($M_{11}$) and ($M_{12}$) and a valley part ($N_1$), and a concave portion (g) 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the height difference of the concave portion (g) 131, and the length of the difference ($h_2$) between the maximum point of the mountain part ($M_{13}$) and the minimum point of the valley part ($N_2$) indicates the height difference of the concave portion (g) 132.

In the present invention, the "one or more concave portions (g)" existing on the surface (α) are the one or more concave portions having a maximum height difference of 0.5 μm or more. The "one or more concave portions (g)" as defined in the present invention may be one having a site with a height difference of 0.5 μm or more in any part of the one or more concave portion (g), and the one or more concave portion needs not to have the height difference in the entire region thereof.

The maximum value of the height difference of one concave portion (g) is 0.5 μm or more, but is, from the viewpoint of improving the air escape property of the pressure sensitive adhesive sheet, from the viewpoint of keeping the appearance of the pressure sensitive adhesive sheet good, and from the viewpoint of the shape stability of the pressure sensitive adhesive sheet, preferably 1.0 μm or more and not more than the thickness of the resin layer, more preferably 3.0 μm or more and not more than the thickness of the resin layer, and even more preferably 5.0 μm or more and not more than the thickness of the resin layer.

The ratio of the maximum height difference of plural concave portions (g) existing inside the region (R) to the thickness of the resin layer [maximum height difference/ thickness of resin layer] is preferably 1/100 to 100/100, more preferably 5/100 to 99/100, even more preferably 10/100 to 96/100, still more preferably 15/100 to 90/100.

The mean value of the width of the one or more concave portions (g) is, from the viewpoint of improving the air escape property of the pressure sensitive adhesive sheet and from the viewpoint of bettering the pressure sensitive adhesiveness of the pressure sensitive adhesive sheet, preferably 1 to 500 μm, more preferably 3 to 400 μm, even more preferably 5 to 300 μm.

In the present invention, the width of the concave portion (g) means the distance between the maximum points of the two mountain parts, and in the concave portion (g) 13' shown in FIG. 5(a), the width indicates the distance L between the mountain part ($M_1$) and the mountain part ($M_2$). In the concave portion (g) 131 shown in FIG. 5(b), the width indicates the distance $L_1$ between the mountain part ($M_{11}$) and the mountain part ($M_{12}$), and in the concave portion 132 therein, the width indicates the distance $L_2$ between the mountain part ($M_{13}$) and the mountain part ($M_{12}$).

In a planar view of the pressure sensitive adhesive sheet of the present invention (when the sheet is viewed from directly above), when the concave portion (g) has a long wide and a short side, the short side is the width.

The ratio of the maximum height difference of one concave portion (g) to the mean value of the width [maximum height difference/mean value of width) (in the concave portion (g) 13' shown in FIG. 5(a), the ratio is "h/L") is, from the viewpoint of improving the air escape property of the pressure sensitive adhesive sheet and from the viewpoint of bettering the pressure sensitive adhesiveness of the pressure sensitive adhesive sheet, preferably 1/500 to 100/1, more preferably 3/400 to 70/3, even more preferably 1/60 to 10/1.

From the viewpoint of providing a pressure sensitive adhesive sheet having an increased air escape property, it is desirable that, when the surface (α) of the resin layer is attached to the smooth surface of a light transmissive adherend, the shape of the attached portion to the smooth surface of the light transmissive adherend in the surface (α) could be visually recognized from the side of the light transmissive adherend.

Further, from the viewpoint of providing a pressure sensitive adhesive sheet having well-balanced characteristics of air escape property, appearance, pressure sensitive adhesion characteristic and punching property, the shape of the attached portion of the smooth surface of the light transmissive adherend to the surface (α) preferably has an irregular shape.

Regarding the "irregular shape(s)", the same definition as that for the irregular shape(s) of the above-mentioned concave portions (G) shall apply thereto.

In the following, each constitution of the pressure sensitive adhesive sheet of the present invention will be described.

Substrate

The substrate used in one embodiment of the present invention is not particularly limited, and examples thereof include a paper substrate, a resin film or sheet, and a substrate containing a paper substrate laminated with a resin, which may be appropriately selected depending on the purpose of the pressure sensitive adhesive sheet according to one embodiment of the present invention.

Examples of paper constituting the paper substrate include thin paper, medium quality paper, wood-free paper, impregnated paper, coated paper, art paper, parchment paper, and glassine paper.

Examples of the resin constituting the resin film or sheet include a polyolefin resin, such as polyethylene and polypropylene; a vinyl resin, such as polyvinyl chloride, polyvinylidene chloride, polyvinyl alcohol, an ethylene-vinyl acetate copolymer, and an ethylene-vinyl alcohol copolymer; a polyester resin, such as polyethylene terephthalate, polybutylene terephthalate, and polyethylene naphthalate; polystyrene; an acrylonitrile-butadiene-styrene copolymer; cellulose triacetate; polycarbonate; an urethane resin, such as polyurethane and acrylic-modified polyurethane; polymethylpentene; polysulfone; polyether ether ketone; polyether sulfone; polyphenylenesulfide; a polyimide resin, such as polyether imide and polyimide; a polyamide resin; an acrylic resin; and a fluorine resin.

Examples of the substrate containing a paper substrate laminated with a resin include laminated paper containing the aforementioned paper substrate laminated with a thermoplastic resin, such as polyethylene.

Among these substrates, a resin film or sheet is preferred, a film or sheet formed of a polyester resin is more preferred, and a film or sheet formed of polyethylene terephthalate (PET) is further preferred.

In the case where the pressure sensitive adhesive sheet of the present invention is applied to a purpose that requires heat resistance, a film or sheet constituted by a resin selected from polyethylene naphthalate and a polyimide resin is preferred, and in the case where the pressure sensitive adhesive sheet is applied to a purpose that requires weather resistance, a film or sheet constituted by a resin selected from polyvinyl chloride, polyvinylidene chloride, an acrylic resin, and a fluorine resin is preferred.

The thickness of the substrate may be appropriately determined depending on the purpose of the pressure sensitive adhesive sheet of the present invention, and is preferably from 5 to 1,000 μm, more preferably from 10 to 500 μm, further preferably from 12 to 250 μm, and still further preferably from 15 to 150 μm, from the standpoint of the handleability and the economic efficiency.

The substrate may further contain various additives, such as an ultraviolet ray absorbent, a light stabilizer, an antioxidant, an antistatic agent, a slipping agent, an antiblocking agent, and a colorant.

The substrate used in one embodiment of the present invention is preferably a non-air permeable substrate from the standpoint of enhancing the blister resistance of the resulting pressure sensitive adhesive sheet, and specifically a substrate containing the aforementioned resin film or sheet having a metal layer on the surface thereof.

Examples of the metal forming the metal layer include a metal having metallic gloss, such as aluminum, tin, chromium, and titanium.

Examples of the method of forming the metal layer include a method of vapor-depositing the metal by a PVD method, such as vacuum vapor deposition, sputtering, and ion plating, and a method of attaching a metal foil formed of the metal with an ordinary pressure sensitive adhesive, and a method of vapor-depositing the metal by a PVD method is preferred.

In the case where a resin film or sheet is used as the substrate, the surface of the resin film or sheet may be subjected to a surface treatment by an oxidizing method, a roughening method, and the like, or may be subjected to a primer treatment, from the standpoint of enhancing the adhesion to the resin layer to be laminated on the resin film or sheet.

Examples of the oxidizing method include a corona discharge treatment, a plasma discharge treatment, a chromic acid treatment (wet process), a hot air treatment, and an ozone treatment, and an ultraviolet ray irradiation treatment, and examples of the roughening treatment include a sand blasting treatment and a solvent treatment.

Release Material

The release material used in one embodiment of the present invention may be a release sheet having both surfaces subjected to a release treatment, and a release sheet having one surface subjected to a release treatment, and examples thereof include a substrate for the release material having coated thereon a release agent. The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet according to one embodiment of the present invention.

Examples of the release agent include a rubber elastomer, such as a silicone resin, an olefin resin, an isoprene resin, and a butadiene resin; a long-chain alkyl resin; an alkyd resin; and a fluorine resin.

The thickness of the release material is not particularly limited, and is preferably from 10 to 200 μm, more preferably from 25 to 170 μm, and further preferably from 35 to 80 μm.

[Resin Layer]

The resin layer that the pressure sensitive adhesive sheet of the present invention has contains a resin part (X) containing a resin as a main component and a particle part (Y) consisting of fine particles.

In the pressure sensitive adhesive sheet of the present invention, at least the surface (α) of the resin layer on the side opposite to the side on which at least substrate or a release material is provided has pressure sensitive adhesiveness, but the surface (β) of the resin layer on the side on which a substrate or a release material is provided may also has pressure sensitive adhesiveness.

The resin layer that one embodiment of the pressure sensitive adhesive sheet of the present invention has preferably has void part (Z) in addition to the resin part (X) and the particle part (Y). The void part (Z), if any, in the resin layer can improve the blister resistance of the pressure sensitive adhesive sheet.

The void part (Z) includes the voids existing between the fine particles and, when the fine particles are secondary particles, the voids existing inside the secondary particles.

In the case where the resin layer has a multilayer structure, even though a void part (Z) exists in the process of forming the resin layer or just after formation of the layer, the resin part (X) may flow into the void part (Z) and therefore the voids may disappear to give a resin layer not having the void part (Z).

However, even in the case where a void part (Z) having existed in the resin layer for a period of time has disappeared, the resin layer that one embodiment of the pressure sensitive adhesive sheet of the present invention has may have one or more concave portions on the surface ($\alpha$) and can be therefore excellent in air escape property and blister resistance.

The shear storage elastic modulus at 100° C. of the resin layer that one embodiment of the pressure sensitive adhesive sheet of the present invention has is, from the viewpoint of improving the air escape property and the blister resistance of the pressure sensitive adhesive sheet, preferably $9.0 \times 10^3$ Pa or more, more preferably $1.0 \times 10^4$ Pa, even more preferably $2.0 \times 10^4$ Pa or more.

In the present invention, the shear storage elastic modulus at 100° C. of the resin layer means a value measured with a viscoelastometer (for example, apparatus name "DYNAMIC ANALYZER RDA II" manufactured by Rheometrics Inc.) at a frequency of 1 Hz.

The thickness of the resin layer is preferably 1 to 300 µm, more preferably 5 to 150 µm, even more preferably 10 to 75 µm.

The adhesive strength of one embodiment of the pressure sensitive adhesive sheet of the present invention is preferably 0.5 N/25 mm or more, more preferably 2.0 N/25 mm or more, even more preferably 3.0 N/25 mm or more, further more preferably 4.0 N/25 mm or more, still further more preferably 7.0 N/25 mm or more.

The value of the adhesive strength of the pressure sensitive adhesive sheet means a value measured according to the method described in the section of Examples. A preferred embodiment of the pressure sensitive adhesive sheet of the present invention, in which the resin layer contains a resin part (X) containing a resin as a main component and a particle part (Y) consisting of fine particles, is described below.

<Resin Part (X)>

The resin part (X) constituting the resin layer contains a resin as a main component.

In the present invention, the resin part (X) is a part containing any other component than fine particles contained in the resin layer, and in this point, this is differentiated from the particle part (Y).

The resin part (X) contains a resin as a main component and may contain a crosslinking agent and ordinary additives in addition to resin.

The content of the resin in the resin part (X) is generally 40% by mass or more, and is preferably 50% by mass or more, more preferably 65% by mass or more, even more preferably 75% by mass or more, still more preferably 85% by mass or more, further more preferably 90% by mass or more, relative to the total amount (100% by mass) of the resin part (X) and is preferably 100% by mass or less, more preferably 99.9% by mass or less, relative to the total amount (100% by mass) of the resin part (X).

In the present invention, a value of the content of the resin in the resin composition to be the forming material for the resin part (X) is considered to be the above-mentioned "content of the resin in the resin part (X)".

The resin to be contained in the resin part (X) is preferably a pressure sensitive adhesive resin from the viewpoint of making the surface ($\alpha$) of the resin layer to be formed express pressure sensitive adhesiveness.

In particular, in the case where the resin layer has a multilayer structure formed by laminating a layer (X$\beta$), a layer (Y1) and a layer (X$\alpha$) in this order from the side on which a substrate or a release material is provided, like in the pressure sensitive adhesive sheet 1a of FIG. 2(a), it is desirable from the above-mentioned viewpoints that at least the layer (X$\alpha$) contains a pressure sensitive adhesive resin.

Examples of the pressure sensitive adhesive resin include acrylic resins, urethane resins, rubber resins, silicone resins, etc.

Among these pressure sensitive adhesive resins, an acrylic resin is preferably contained from the viewpoint of facilitating formation of the one or more concave portions (G) and the concave portions (g) on the surface ($\alpha$) of the resin layer.

The content of the acrylic resin is preferably 25 to 100% by mass, and is more preferably 50 to 100% by mass, even more preferably 70 to 100% by mass, still more preferably 80 to 100% by mass, further more preferably 100% by mass, relative to the total amount (100% by mass) of the resin contained in the resin part (X).

From the viewpoint of facilitating formation of the above-mentioned one or more concave portions (G) and one or more concave portions (g) on the surface ($\alpha$) of the resin layer to be formed, it is desirable that the resin part (X) contains a resin having a functional group, more preferably an acrylic resin having a functional group.

In particular, in the case where the resin layer has a multilayer structure formed by laminating a layer (X$\beta$), a layer (Y1) and a layer (X$\alpha$) in this order from the side on which a substrate or a release material is provided, like in the pressure sensitive adhesive sheet 1a of FIG. 2(a), it is desirable from the above-mentioned viewpoints that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, an alkoxysilyl group, etc., but a carboxyl group is preferred.

In the case where the resin composition to be a forming material for the resin part (X) contains the above-mentioned, functional group-having resin, it is desirable that the resin composition further contains a crosslinking agent. In particular, in the case where the resin layer has the above-mentioned multilayer structure, it is desirable that at least the composition to be a forming material for the layer (Y1) contains a crosslinking agent along with the above-mentioned, functional group-having resin.

Examples of the crosslinking agent include an isocyanate crosslinking agent, an epoxy crosslinking agent, an aziridine crosslinking agent, a metal chelate crosslinking agent, etc.

Examples of the isocyanate crosslinking agent include aromatic polyisocyanates such as tolylene diisocyanate, diphenylmethane diisocyanate, xylylene diisocyanate, etc.; aliphatic polyisocyanates such as hexamethylene diisocyanate, etc.; alicyclic polyisocyanates such as isophorone diisocyanate, hydrogenated diphenylmethane diisocyanate, etc.; biuret forms and isocyanurate forms of these compounds, and adduct forms that are reaction products with a low-molecular active hydrogen-containing compounds (ethylene glycol, propylene glycol, neopentyl glycol, trimethylolpropane, castor oil, etc.); etc.

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, diglycidylamine, etc.

Examples of the aziridine crosslinking agent include diphenylmethane-4,4'-bis(1-aziridinecarboxamide), trimethylolpropane-tri-β-aziridinylpropionate, tetramethylolmethane tri-β-aziridinylpropionate, toluene-2,4-bis(1-aziridinecarboxamide), triethylenemelamine, bisisophthaloyl-1-(2-methylaziridine), tris-1-(2-methylaziridine) phosphine, trimethylolpropane tri-β-(2-methylaziridine)propionate, etc.

The metal chelate crosslinking agent includes chelate compounds where the metal atom is aluminium, zirconium, titanium, zinc, iron, tin or the like. From the viewpoint of facilitating formation of the above-mentioned one or more concave portions (G) and one or more concave portions (g), an aluminium chelate crosslinking agent is preferred.

Examples of the aluminium chelate crosslinking agent include diisopropoxy aluminium monooleylacetacetate, monoisopropoxy aluminium bisoleylacetacetate, monoisopropoxy aluminum monooleate monoethylacetacetate, diisopropoxy aluminium monolauroylacetacetate, diisopropoxy aluminium monostearylacetacetate, and diisopropoxy aluminium monoisostearylacetacetate, etc.

One alone or two or more of these crosslinking agents may be used either singly or as combined.

Among these, from the viewpoint of facilitating formation of the one or more concave portions (G) and the one or more concave portions (g) on the surface (α) of the resin layer to be formed, it is desirable that the resin part (X) contains one or more selected from a metal chelate crosslinking agent, an epoxy crosslinking agent and an aziridine crosslinking agent, more preferably contains a metal chelate crosslinking agent, and even more preferably contains an aluminium chelate crosslinking agent.

The content of the crosslinking agent is preferably 0.01 to 15 parts by mass, is more preferably 0.1 to 10 parts by mass, even more preferably 0.3 to 7.0 parts by mass, relative to 100 parts by mass of the resin having a functional group.

From the viewpoint of bettering the shape retentive force of the one or more concave portions (G) and the one or more concave portions (g) on the surface (α) of the resin layer, it is desirable that the resin part (X) contains both a metal chelate crosslinking agent and an epoxy crosslinking agent.

In the case where the resin part (X) contains both a metal chelate crosslinking agent and an epoxy crosslinking agent, the content ratio by mass of the metal chelate crosslinking agent to the epoxy crosslinking agent [metal chelate crosslinking agent/epoxy crosslinking agent] in the resin part (X) is, from the above-mentioned viewpoints, preferably 10/90 to 99.5/0.5, more preferably 50/50 to 99.0/1.0, even more preferably 65/35 to 98.5/1.5, further more preferably 75/25 to 98.0/2.0.

The resin part (X) may contain any ordinary additive.

Examples of the ordinary additive include a tackifier, an antioxidant, a softener (plasticizer), a rust inhibitor, a pigment, a dye, a retardant, a reaction accelerator, a UV absorbent, etc.

One alone or two or more of these ordinary additives may be used either singly or as combined.

In the case where these ordinary additives are contained, the content of each ordinary additive is preferably 0.0001 to 60 parts by mass, and is more preferably 0.001 to 50 parts by mass, relative to 100 parts by mass of the resin.

One alone or two or more resins may be contained in the resin part (X) either singly or as combined.

The forming material for the resin part (X) of the resin layer that the pressure sensitive adhesive sheet of the present invention has is preferably a pressure sensitive adhesive containing a pressure sensitive adhesive resin having a functional group, more preferably an acrylic adhesive containing an acrylic resin (A) having a functional group (hereinafter this may be simply referred to as "acrylic resin (A)"), and even more preferably an acrylic adhesive containing a functional group-having acrylic resin (A) and a crosslinking agent (B).

The acrylic adhesive may be any of a solvent-type one or an emulsion-type one.

The acrylic adhesive favorable for the forming material for the resin part (X) is described below.

Examples of the acrylic resin (A) contained in the acrylic adhesive include a polymer having a structural unit derived from an alkyl (meth)acrylate having a linear or branched alkyl group, a polymer having a structural unit derived from a (meth)acrylate having a cyclic structure, etc.

The mass-average molecular weight (Mw) of the acrylic resin (A) is preferably 50,000 to 1,500,000, more preferably 150,000 to 1,300,000, even more preferably 250,000 to 1,100,000, still more preferably 350,000 to 900,000.

Preferably, the acrylic resin (A) contains an acrylic copolymer (A1) having a structural unit (a1) derived from an alkyl (meth)acrylate (a1') having an alkyl group with 1 to 18 carbon atoms (hereinafter this may be referred to as "monomer (a1')"), and a structural unit (a2) derived from a functional group-containing monomer (a2') (hereinafter this may be referred to as "monomer (a2')"), and more preferably contains an acrylic copolymer (A1).

The content of the acrylic copolymer (A1) is preferably 50 to 100% by mass, and is more preferably 70 to 100% by mass, even more preferably 80 to 100% by mass, further more preferably 90 to 100% by mass, relative to the total amount (100% by mass) of the acrylic resin (A) in the acrylic adhesive.

The copolymerization morphology of the acrylic copolymer (A1) is not specifically limited, and the copolymer may be any of a block copolymer, a random copolymer or a graft copolymer.

The carbon number of the alkyl group that the monomer (a1') has is, from the viewpoint of improving pressure sensitive adhesive characteristics, more preferably 4 to 12, even more preferably 4 to 8, further more preferably 4 to 6.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, stearyl (meth)acrylate, etc.

Among these, butyl (meth)acrylate and 2-ethylhexyl (meth)acrylate are preferred, and butyl (meth)acrylate is more preferred.

The content of the structural unit (a1) is preferably 50 to 99.5% by mass, and is more preferably 60 to 99% by mass, even more preferably 70 to 95% by mass, still more preferably 80 to 93% by mass, relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, an alkoxysilyl group-containing monomer, etc.

Among these, a carboxy group-containing monomer is more preferred.

The carboxy group-containing monomer includes (meth) acrylic acid, maleic acid, fumaric acid, itaconic acid, etc., and (meth)acrylic acid is preferred.

The content of the structural unit (a2) is preferably 0.5 to 50% by mass, and is more preferably 1 to 40% by mass, even more preferably 5 to 30% by mass, still more preferably 7 to 20% by mass, relative to all the structural units (100% by mass) of the acrylic copolymer (A1).

The acrylic copolymer (A1) may have a structural unit (a3) derived from any other monomer (a3') than the above-mentioned monomers (a1') and (a2').

Examples of the other monomer (a3') include (meth) acrylates having a cyclic structure such as cyclohexyl (meth) acrylate, benzyl (meth)acrylate, isobornyl (meth)acrylate, dicyclopentanyl (meth)acrylate, dicyclopentenyl (meth) acrylate, dicyclopentanyloxyethyl (meth)acrylate, imido (meth)acrylate, etc.; vinyl acetate, acrylonitrile, styrene, etc.

The content of the structural unit (a3) is preferably 0 to 30% by mass, and is more preferably 0 to 20% by mass, even more preferably 0 to 10% by mass, still more preferably 0 to 5% by mass, relative to all the structural units (100% by mass) of the acrylic copolymer (A1).

One alone or two or more of the above-mentioned monomers (a1') to (a3') may be used either singly or as combined.

A method for synthesis of the acrylic copolymer (A1) component is not specifically limited. For example, the copolymer may be produced according to a method including dissolving starting monomers in a solvent and polymerizing them in a mode of solution polymerization in the presence of a polymerization initiator, a chain transfer agent and the like, or a method of emulsion polymerization in an aqueous system using starting monomers in the presence of an emulsifier, a polymerization initiator, a chain transfer agent, a dispersant, etc.

The crosslinking agent (B) to be contained in the acrylic adhesive includes those mentioned hereinabove, but from the viewpoint of bettering pressure sensitive adhesion characteristics and from the viewpoint of facilitating the formation of the concave portions (G) and the concave portions (g) on the surface (α) of the resin layer to be formed, at least one or more selected from a metal chelate crosslinking agent, an epoxy crosslinking agent and an aziridine crosslinking agent are preferably contained, more preferably a metal chelate crosslinking agent is contained, and even more preferably an aluminium chelate crosslinking agent is contained.

From the viewpoint of bettering the shape retentivity of the concave portions (G) and the concave portions (g) on the surface (α) of the resin layer, the crosslinking agent (B) preferably contains both a metal chelate crosslinking agent and an epoxy crosslinking agent.

The content of the crosslinking agent (B) is preferably 0.01 to 15 parts by mass, and is more preferably 0.1 to 10 parts by mass, even more preferably 0.3 to 7.0 parts by mass, relative to 100 parts by mass of the acrylic resin (A) in the acrylic adhesive.

In the case where a metal chelate crosslinking agent and an epoxy crosslinking agents are used as combined, the content ratio by mass of the metal chelate crosslinking agent to the epoxy crosslinking agent [metal chelate crosslinking agent/epoxy crosslinking agent] is preferably 10/90 to 99.5/0.5, more preferably 50/50 to 99.0/1.0, even more preferably 65/35 to 98.5/1.5, further more preferably 75/25 to 98.0/2.0.

The acrylic adhesive to be used in one embodiment of the present invention may contain any ordinary additive within a range not detracting from the advantageous effects of the present invention. The general additive includes those mentioned hereinabove, and the content of the ordinary additive is also as mentioned above.

The acrylic adhesive to be used in one embodiment of the present invention may contain any other adhesive resin than the acrylic resin (A) (for example, urethane resin, rubber resin, silicone resin, etc.) within a range not detracting from the advantageous effects of the present invention.

The content of the acrylic resin (A) in the acrylic adhesive is preferably 50 to 100% by mass, and is more preferably 70 to 100% by mass, even more preferably 80 to 100% by mass, still more preferably 100% by mass, relative to the total amount (100% by mass) of the pressure sensitive adhesive resin contained in the acrylic adhesive.

<Particle Part (Y)>

The particle part (Y) constituting the resin layer consists of fine particles.

The mean particle size of the fine particles is, from the viewpoint of improving the air escape property and the blister resistance of the pressure sensitive adhesive sheet and from the viewpoint of facilitating the formation of the concave portions (G) and the concave portions (g) on the surface (α) of the resin layer to be formed, preferably 0.01 to 100 μm, more preferably 0.05 to 25 μm, even more preferably 0.1 to 10 μm.

The fine particles to be used in one embodiment of the present invention are not specifically limited, including inorganic particles such as silica particles, metal oxide particles, barium sulfate, calcium carbonate, magnesium carbonate, glass beads, smectite and the like, and organic particles such as acrylic beads, etc.

Among these fine particles, one or more selected from silica particles, metal oxide particles and smectite are preferred, and silica particles are more preferred.

The silica particles that are used in one embodiment of the present invention may be any ones of dry-method silica and wet-method silica.

The silica particles that are used in one embodiment of the present invention may also be an organic-modified silica that has been surface-modified with an organic compound having a reactive functional group or the like, an inorganic-modified silica that has been surface-treated with an inorganic compound such as sodium aluminate, sodium hydroxide or the like, as well as an organic/inorganic-modified silica that has been surface-treated with any of these organic compounds and inorganic compounds, or an organic/inorganic-modified silica that has been surface-treated with an organic/inorganic hybrid material of a silane coupling agent, etc.

These silica particles may be in the form of a mixture of two or more kinds.

The mass concentration of silica in the silica particles is preferably 70 to 100% by mass, and is more preferably 85 to 100% by mass, even more preferably 90 to 100% by mass, relative to the total amount (100% by mass) of the silica particles.

The volume-average secondary particle diameter of the silica particles that are used in one embodiment of the present invention is, from the viewpoint of improving the air escape property and the blister resistance of the pressure sensitive adhesive sheet, and from the viewpoint of facilitating the formation of plural concave portions on the surface (α) of the resin layer to be formed, preferably 0.5 to 10 μm, more preferably 1 to 8 μm, even more preferably 15 to 5 μm.

In the present invention, the value of the volume-average secondary particle diameter of the silica particles is a value determined through measurement of particle size distribution according to a Coulter counter method using Multisizer III or the like.

Examples of the metal oxide particles include particles of a metal oxide selected from titanium oxide, alumina, boehmite, chromium oxide, nickel oxide, copper oxide, titanium oxide, zirconium oxide, indium oxide, zinc oxide, and composite oxides thereof, etc., and include sol particles of those metal oxides.

Examples of smectite include montmorillonite, beidellite, hectorite, saponite, stevensite, nontronite, sauconite, etc.

The mass retention rate after heating the resin layer that one embodiment of the pressure sensitive adhesive sheet of the present invention has, at 800° C. for 30 minutes is preferably 3 to 90% by mass, more preferably 5 to 80% by mass, even more preferably 7 to 70% by mass, still more preferably 9 to 60% by mass.

The mass retention rate can be considered to indicate the content (% by mass) of the fine particles contained in the resin layer.

When the mass retention rate is 3% by mass or more, the pressure sensitive adhesive sheet can be excellent in air escape property and blister resistance. In addition, in production of the pressure sensitive adhesive sheet of the present invention, the concave portions (G) and the concave portions (g) can be readily formed on the surface (α) of the resin layer to be formed. On the other hand, when the mass retention rate is 90% by mass or less, a pressure sensitive adhesive sheet can be provided in which the film strength of the resin layer is high and which is excellent in water resistance and chemical resistance.

[Production Method for Pressure Sensitive Adhesive Sheet]

A production method for the pressure sensitive adhesive sheet of the present invention is described below.

The production method for the pressure sensitive adhesive sheet of the present invention is not specifically limited, but from the viewpoint of productivity and from the viewpoint of facilitating the formation of the concave portions (G) and the concave portions (g) on the surface (α) of the resin layer to be formed, a method having at least the following steps (1) and (2) is preferred.

Step (1): a step of forming a coating film (x') containing a composition (x) containing a resin as a main component, and a coating film (y') containing a composition (y) containing fine particles in an amount of 15% by mass or more Step (2): a step of drying the coating film (x') and the coating film (y') formed in the step (1) simultaneously <Step (1)>

The step (1) is a step of forming a coating film (x') containing a composition (x) containing a resin as a main component, and a coating film (y') containing a composition (y) containing fine particles in an amount of 15% by mass or more.

The composition (x) is a forming material for the resin part (X), and preferably contains a crosslinking agent along with the above-mentioned resin, and may further contain the above-mentioned ordinary additive.

The composition (y) is a forming material for the particle part (Y), and may contain a resin and a crosslinking agent, as well as the above-mentioned ordinary additive. The composition (y) containing those components of resin and others could also be a forming material for the resin part (X).

(Composition (x))

The resin contained in the composition (x) includes a resin that constitutes the above-mentioned resin part (X), and is preferably a pressure sensitive adhesive resin having a functional group, more preferably the above-mentioned functional group-having acrylic resin (A), and is preferably the above-mentioned acrylic copolymer (A1).

The content of the resin in the composition (x) is generally 40% by mass or more, and is preferably 50% by mass or more, more preferably 65% by mass or more, even more preferably 75% by mass or more, still more preferably 85% by mass or more, further more preferably 90% by mass or more, relative to the total amount (100% by mass (but excluding diluent solvent)) of the composition (x), and is preferably 100% by mass or less, more preferably 95% by mass or less, relative to the total amount (100% by mass (but excluding diluent solvent)) of the composition (x).

The crosslinking agent contained in the composition (x) includes the crosslinking agent contained in the above-mentioned resin part (X). Preferably, one or more selected from a metal chelate crosslinking agent, an epoxy crosslinking agent and an aziridine crosslinking agent are contained, and more preferably a metal chelate crosslinking agent is contained.

Further, from the viewpoint of bettering the shape retentivity of the concave portions (g) on the surface (α) of the resin layer to be formed, it is desirable that the composition (x) contains both a metal chelate crosslinking agent and an epoxy crosslinking agent.

In the case where the composition (x) contains both a metal chelate crosslinking agent and an epoxy crosslinking agent, the content ratio by mass of the metal chelate crosslinking agent to the epoxy crosslinking agent in the composition (x) [metal chelate crosslinking agent/epoxy crosslinking agent] is preferably 10/90 to 99.5/0.5, more preferably 50/50 to 99.0/1.0, even more preferably 65/35 to 98.5/1.5, still more preferably 75/25 to 98.0/2.0.

The content of the crosslinking agent is preferably 0.01 to 15 parts by mass, and is more preferably 0.1 to 10 parts by mass, even more preferably 0.3 to 7.0 parts by mass, relative to 100 parts by mass of the resin contained in the composition (x).

Preferably, the composition (x) is an acrylic adhesive containing the above-mentioned functional group-having acrylic resin (A) and crosslinking agent (B), more preferably an acrylic adhesive containing the above-mentioned acrylic copolymer (A1) and crosslinking agent (B).

The details of the acrylic pressure sensitive adhesive are as mentioned above.

The composition (x) may contain the above-mentioned fine particles, in which the content of the fine particles is less than 15% by mass and is smaller than the content of the resin contained in the composition (x).

Specifically, the content of the fine particles is less than 15% by mass, and is preferably 0 to 13% by mass, more preferably 0 to 10% by mass, even more preferably 0 to 5% by mass, still more preferably 0% by mass, relative to the total amount (100% by mass (but excluding diluent solvent)) of the composition (x).

(Composition (y))

The composition (y) is a forming material for the particle part (Y), and contains at least the above-mentioned fine particles in an amount of 15% by mass or more, but from the viewpoint of the dispersibility of the fine particles therein, the composition preferably contains a resin along with the fine particles, and more preferably further contains a crosslinking agent along with the rein. The composition (y) may contain any ordinary additive.

These resin, crosslinking agent and ordinary additive may be the forming material for the resin part (X).

The fine particles to be contained in the composition (y) include those mentioned hereinabove, and from the viewpoint of forming the void part (Z) in the resin layer to provide a pressure sensitive adhesive sheet having improved blister resistance, one or more kinds selected from silica particles, metal oxide particles and smectite are preferred.

The content of the fine particles in the composition (y) is, from the viewpoint of facilitating the formation of the irregular concave portions (g) on the surface (α) of the resin layer through self-formation of the resin layer, 15% by mass or more, and is preferably 20 to 100% by mass, more preferably 25 to 90% by mass, even more preferably 30 to 85% by mass, still more preferably 35 to 80% by mass, relative to the total amount (100% by mass (but excluding diluent solvent)) of the resin composition (y).

The resin to be contained in the composition (y) includes the same ones as those of the resin to be contained in the above-mentioned composition (x), and preferably contains the same resin as in the composition (x). One alone or two or more of these resins may be used either singly or as combined.

More specifically, the resin to be contained in the composition (y) is preferably a resin having a functional group, more preferably the above-mentioned functional group-having acrylic resin (A), even more preferably the above-mentioned acrylic copolymer (A1).

The content of the resin in the composition (y) is generally 1 to 85% by mass, and is preferably 5 to 80% by mass, more preferably 10 to 75% by mass, even more preferably 20 to 70% by mass, further more preferably 25 to 65% by mass, relative to the total amount (100% by mass (but excluding diluent solvent)) of the composition (y).

The crosslinking agent to be contained in the composition (y) includes those of the crosslinking agent to be contained in the above-mentioned resin part (X), but preferably the composition (y) contains at least one or more selected from a metal chelate crosslinking agent, an epoxy crosslinking agent and an aziridine crosslinking agent, more preferably a metal chelate crosslinking agent. Also preferably, the composition (y) contains both a metal chelate crosslinking agent and an epoxy crosslinking agent.

In the case where the composition (y) contains both a metal chelate crosslinking agent and an epoxy crosslinking agent, a preferred range of the content ratio (by mass) of the metal chelate crosslinking agent to the epoxy crosslinking agent in the composition (y) is the same as in the above-mentioned composition (x).

The content of the crosslinking agent is preferably 0.01 to 15 parts by mass, and is more preferably 0.1 to 10 parts by mass, even more preferably 0.3 to 7.0 parts by mass, relative to 100 parts by mass of the resin contained in the composition (y).

(Formation Method for Coating Film (x'), (y'))

For facilitating the formation of a coating film, it is desirable that a solvent is incorporated in the composition (x) or (y) to give a solution of the composition.

The solvent includes water, organic solvents, etc.

Examples of the organic solvent include toluene, ethyl acetate, butyl acetate, methyl ethyl ketone, methyl isobutyl ketone, methanol, ethanol, isopropyl alcohol, t-butanol, s-butanol, acetylacetone, cyclohexanone, n-hexane, cyclohexane, etc. One alone or two or more of these solvents may be used either singly or as combined.

The order of laminating the coating films (x') and (y') to be formed in this step is not specifically limited, but preferably, the coating film (x') is laminated on the coating film (y').

Regarding the formation method for the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, a die coater, etc.

Examples of the coater for use in simultaneous coating with a multilayer coater include a curtain coater, a die coater, etc., and among these, a die coater is preferred from the viewpoint of operability.

In this step (1), after the formation of at least one of the coating film (x') and the coating film (y') and prior to the step (2), pre-drying treatment may be carried out in such a degree that the curing reaction of the coating film could not go on.

The drying temperature in the pre-drying treatment in this step (1) is generally settled within a temperature range in which the formed coating film is not cured, but is preferably lower than the drying temperature in the step (2). A specific drying temperature indicated by the definition of indicating a range "lower than the drying temperature in the step (2)" is preferably 10 to 45° C., more preferably 10 to 34° C., even more preferably 15 to 30° C.

<Step (2)>

The step (2) is a step of drying the coating film (x') and the coating film (y') formed in the step (1) simultaneously.

In this step, the coating film (x') and the coating film (y') formed are dried simultaneously, whereby a resin layer containing the resin part (X) and the particle part (Y) is formed and in addition, the concave portions (g) are formed on the surface (α) of the resin layer.

The drying temperature in this step is, from the viewpoint of facilitating the formation of the concave portions (G) and the concave portions (g) on the surface (α) of the resin layer to be formed, preferably 35 to 200° C., more preferably 60 to 180° C., even more preferably 70 to 160° C., still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material that the pressure sensitive adhesive sheet has can be free from trouble of shrinkage thereof.

When the drying temperature is lower, the height difference of the concave portions (g) to be formed could increase but the number of the concave portions (g) to be formed tends to decrease.

In the vicinity of the particle part (Y) of the resin layer to be formed in this step, a void part (Z) may be formed.

The void part (Z) can be readily formed by using at least one or more selected from silica particles, metal oxide particles and smectite as the fine particles to be contained in the composition (y).

In the case where a pressure sensitive adhesive sheet having a resin layer having a multilayer structure is produced in which the multilayer structure is formed by laminating a layer (Xβ) mainly containing the resin part (X), a layer (Y1) containing the particle part (Y) in a ratio of 15% by mass or more, and a layer (Xα) mainly containing the resin part (X) in this order, like the pressure sensitive adhesive sheet 1a of FIG. 1(a), a production method of the following first and second embodiments is preferred.

In the description of the production method of the following first and second embodiments, the "composition (xβ)

or (xα) containing a resin as a main component" is the same as the above-mentioned composition (x), and the details of the constituent components contained in the composition (xβ) or (xα) (kind of the component, preferred components, content of the component, etc.) are also the same as in the latter. The "composition (y) containing fine particles in an amount of 15% by mass or more" is also as mentioned above.

[Production Method of First Embodiment]

The production method of the first embodiment has at least the following steps (1A) and (2A).

Step (1A): a step of forming, on a substrate or a release material, a coating film (xβ') containing a composition (xβ) containing a resin as a main component, a coating film (y') containing a composition (y) containing fine particles in an amount of 15% by mass or more and a coating film (xα') containing a composition (xα) containing a resin as a main component, as laminated thereon in this order Step (2A): a step of drying the coating film (xβ'), the coating film (y') and the coating film (xα') formed in the step (1A) simultaneously Also in the step (1A), it is desirable that the above-mentioned solvent is incorporated in the composition (xβ), the composition (y) and the composition (xα) to form solutions of the individual compositions, and the resultant solutions are used for coating.

Regarding the formation method for the coating film (xβ'), the coating film (y') and the coating film (xα'), there may be employed a successive formation method of forming a coating film (xβ') on a substrate or a release material, then forming a coating film (y') on the coating film (xβ'), and further forming a coating film (xα') on the coating film (y'), using the above-mentioned coater, or a simultaneous coating method of forming a coating film (xβ'), a coating film (y') and a coating film (xα'), using the above-mentioned multilayer coater.

In the step (1A), after formation of one or more coating films of the coating film (xβ'), the coating film (y') and the coating film (xα') and prior to the step (2A), pre-drying treatment may be carried out in such a degree that the curing reaction of the coating films could not go on.

For example, after formation of the coating film (xβ'), the coating film (y') and the coating film (xα'), such pre-drying treatment may be carried out every time after the formation, or after the formation of the coating film (xβ') and the coating film (y'), the two may be subjected to the pre-drying treatment all together, and then the coating film (xα') may be formed thereon.

In this step (1A), the drying temperature for the pre-drying treatment is generally so settled as to fall within a temperature range in which the formed coating film is not cured, but is preferably lower than the drying temperature in the step (2A). A specific drying temperature indicated by the definition of indicating a range "lower than the drying temperature in the step (2A)" is preferably 10 to 45° C., more preferably 10 to 34° C., even more preferably 15 to 30° C.

The step (2A) is a step of drying the coating film (xβ'), the coating film (y') and the coating film (xα') formed in the step (1A), simultaneously. The preferred range of the drying temperature in this step is the same as that in the above-mentioned step (2). In this step, a resin layer containing the resin part (X) and the particle part (Y) is formed.

[Production Method of Second Embodiment]

The production method of the second embodiment has at least the following steps (1B) and (2B).

Step (1B): a step of forming, on a layer (Xβ) mainly containing a resin part (X) that is provided on a substrate or a release material, a coating film (y') containing a composition (y) containing fine particles in an amount of 15% by mass or more and a coating film (xα') containing a composition (xα) containing a resin as a main component, as laminated thereon in this order Step (2B): a step of drying the coating film (y') and the coating film (xα') formed in the step (1B) simultaneously In the step (1B), the "layer (Xβ) mainly containing a resin part (X)" is formed by drying the above-mentioned coating film (xβ') containing a composition (xβ) containing a resin as a main component.

Since the layer (Xβ) is formed of the composition (xβ), the layer (Xβ) may contain a crosslinking agent, an ordinary additive and others in addition to the resin therein. The content of the resin part (X) in the layer (Xβ) is as described above.

Regarding the formation method for the layer (Xβ), a coating film (xβ') containing a composition (xβ) containing a resin as a main component is formed on a substrate or a release material, and the coating film (xβ') is dried to form the layer.

The drying temperature at this time is not specifically limited, but is preferably 35 to 200° C., more preferably 60 to 180° C., even more preferably 70 to 160° C., still more preferably 80 to 140° C.

This embodiment differs from the above-mentioned first embodiment in that the coating film (y') and the coating film (xα') are formed in this order on the layer (Xβ) formed by drying, but not on the coating film (xβ').

Also in the step (1B), it is desirable that the above-mentioned solvent is incorporated in the composition (y) and the composition (xα) to form solutions of the respective compositions, and thereafter the solutions are used for coating.

Regarding the formation method for the coating film (y') and the coating film (xα'), there may be employed a successive formation method of forming a coating film (y') on the layer (Xβ) and then forming a coating film (xα') on the coating film (y'), using the above-mentioned coater, or a simultaneous coating method of coating with both the coating film (y') and the coating film (xα') using a multilayer coater.

In the step (1B), after formation of the coating film (y') or after formation of the coating film (y') and the coating film (xα') and prior to the step (2B), pre-drying treatment may be carried out in such a degree that the curing reaction of the coating films could not go on.

In this step (1B), the drying temperature for the pre-drying treatment is generally so settled as to fall within a temperature range in which the formed coating film is not cured, but is preferably lower than the drying temperature in the step (2B). A specific drying temperature indicated by the definition of indicating a range "lower than the drying temperature in the step (2B)" is preferably 10 to 45° C., more preferably 10 to 34° C., even more preferably 15 to 30° C.

The step (2B) is a step of drying the coating film (y') and the coating film (xα') formed in the step (1B) simultaneously, and the preferred range of the drying temperature in this step is the same as in the above-mentioned step (2). In this step, a resin layer containing the resin part (X) and the particle part (Y) is formed.

EXAMPLES

The present invention will be described more specifically with reference to the following examples, but the present invention is not limited to the following examples. The property values in the following examples and production examples are values measured by the following methods.

Mass Average Molecular Weight of Resin (Mw)

The measurement was performed by using a gel permeation chromatography instrument ("HLC-8020, a product name, produced by Tosoh Corporation) under the following conditions, and a value measured as the standard polystyrene conversion was used. Measurement Condition Column: "TSK guard column HXL-L", "TSK gel G2500HXL", "TSK gel G2000HXL", and "TSK gel G1000HXL" (all produced by Tosoh Corporation), connected in series Column temperature: 40° C.

Developing solvent: tetrahydrofuran

Flow rate: 1.0 mL/min

Measurement of Volume Average Secondary Particle Diameter of Silica Particles

The volume average secondary particle diameter of the silica particles was obtained by measuring the particle size distribution with Multisizer III (produced by Beckman Coulter Inc.) by the Coulter Counter method.

Measurement of Thickness of Resin Layer

The thickness of the resin layer was measured by observing the cross section of the resin layer of the target pressure sensitive adhesive sheet with a scanning electron microscope ("S-4700", a product name, produced by Hitachi, Ltd.).

Production Examples x-1 to x-6

Preparation of Solutions (x-1) to (x-6) of Resin Composition

To 100 parts by mass of the solution of an acrylic resin with the kind and the solid content shown in Table 1, a crosslinking agent and a diluting solvent with the kinds and the mixed amounts shown in Table 1 were added, so as to prepare solutions (x-1) to (x-6) of a resin composition having the solid contents shown in Table 1.

The details of the components shown in Table 1 used for the preparation of the solutions (x-1) to (x-6) of a resin composition are as follows.

Solution of Acrylic Resin

Solution (i): a mixed solution of toluene and ethyl acetate containing an acrylic resin (x-i) (an acrylic copolymer having structural units derived from butyl acrylate (BA) and acrylic acid (AA), BA/AA=90/10 (% by mass), Mw: 470,000) having a solid concentration of 33.6% by mass Solution (ii): a mixed solution of toluene and ethyl acetate containing an acrylic resin (x-ii) (an acrylic copolymer having structural units derived from butyl acrylate (BA), 2-ethyl hexyl acrylate (2EHA), vinyl acetate (VA c), and acrylic acid (AA), BA/2EHA/VAc/AA=46/37/10/7 (% by mass), Mw: 370,000) having a solid concentration of 43.0% by mass Crosslinking Agent Aluminum chelate crosslinking agent: "M-5A", a product name, produced by Soken Chemical & Engineering Co., Ltd., solid concentration: 4.95% by mass Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass Isocyanate crosslinking agent: "Coronate L", a product name, produced by Tosoh Corporation, solid concentration: 75% by mass Aziridine crosslinking agent: "BXX5134", a product name, produced by Toyochem Co., Ltd., solid concentration: 5% by mass Diluting Solvent IPA: isopropyl alcohol AcOEt: ethyl acetate

TABLE 1

| | Solution of acrylic resin | | | | | Aluminum chelate crosslinking agent (M-5A, solid concentration: 4.95 wt %) | | | Epoxy crosslinking agent (TETRAD-C, solid concentration: 5 wt %) | |
|---|---|---|---|---|---|---|---|---|---|---|
| | Solution of resin composition | Kind | Kind of resin | Mixed amount (part by mass) | Mixed amount of solid content (part by mass) | Mixed amount (part by mass) | Mixed amount of solid content (part by mass) | Solid content per 100 parts by mass of acrylic resin (part by mass) | Mixed amount (part by mass) | Mixed amount of solid content (part by mass) |
| Production Example x-1 | (x-1) | solution (i) | acrylic resin (x-i) (BA/AA = 90/10 (wt %), Mw: 470,000 | 100 | 33.6 | 5 | 0.25 | 0.74 | — | — |
| Production Example x-2 | (x-2) | solution (i) | acrylic resin (x-i) (BA/AA = 90/10 (wt %), Mw: 470,000 | 100 | 33.6 | — | — | — | — | — |
| Production Example x-3 | (x-3) | solution (ii) | Acrylic resin (x-ii) (BA/2EHA/VAc/AA = 46/37/10/7 (wt %), Mw: 370,000 | 100 | 43.0 | 4.5 | 0.22 | 0.52 | 0.3 | 0.015 |
| Production Example x-4 | (x-4) | solution (i) | acrylic resin (x-i) (BA/AA = 90/10 (wt %), Mw: 470,000 | 100 | 33.6 | — | — | — | 0.6 | 0.030 |
| Production Example x-5 | (x-5) | solution (i) | acrylic resin (x-i) (BA/AA = 90/10 (wt %), Mw: 470,000 | 100 | 33.6 | — | — | — | — | — |

TABLE 1-continued

| | | | | | | | | | | | | |
|---|---|---|---|---|---|---|---|---|---|---|---|---|
| Production Example x-6 | (x-6) | solution (i) | acrylic resin (x-i) (BA/AA = 90/10 (wt %), Mw: 470,000 | 100 | 33.6 | — | — | — | — | — | — | — |

| | Epoxy crosslinking agent (TETRAD-C, solid concentration: 5 wt %) Solid content per 100 parts by mass of acrylic resin (part by mass) | Isocyanate crosslinking agent (Coronate L, solid concentration: 75 wt %) | | | Aziridine crosslinking agent (BXX5134, solid concentration: 5 wt %) | | | | |
|---|---|---|---|---|---|---|---|---|---|
| | | Mixed amount (part by mass) | Mixed amount of solid content (part by mass) | Solid content per 100 parts by mass of acrylic resin (part by mass) | Mixed amount (part by mass) | Mixed amount of solid content (part by mass) | Solid content per 100 parts by mass of acrylic resin (part by mass) | Diluting solvent Kind | Solid concentration of solution of resin composition (% by mass) |
| Production Example x-1 | — | — | — | — | — | — | — | IPA | 28 |
| Production Example x-2 | — | — | — | — | — | — | — | IPA | 27 |
| Production Example x-3 | 0.035 | — | — | — | — | — | — | IPA | 34.4 |
| Production Example x-4 | 0.089 | — | — | — | — | — | — | IPA | 24 |
| Production Example x-5 | — | 1.5 | 0.56 | 1.674 | — | — | — | AcOEt | 28 |
| Production Example x-6 | — | — | — | — | 1.0 | 0.050 | 0.149 | AcOEt | 28 |

Production Example y-0

Preparation of Fine Particle Dispersion Liquid (y-0)

To 100 parts by mass (solid content: 33.6 parts by mass) of the solution (i) containing the acrylic resin (x-i) (a mixed solution of toluene and ethyl acetate containing an acrylic copolymer having structural units derived from butyl acrylate (BA) and acrylic acid (AA) (BA/AA=90/10 (% by mass), Mw: 470,000) having a solid concentration of 33.6% by mass), 50.4 parts by mass (solid content: 50.4 parts by mass) of silica particles ("Nipsil E-200A", a product name, produced by Tosoh Silica Corporation, volume average secondary particle diameter: 3 µm) and toluene were added, and the fine particles were dispersed, so as to prepare a fine particle dispersion liquid (y-0) having a solid concentration of 30% by mass containing the acrylic resin and the silica particles.

Production Examples y-1 to y-8

Preparation of Coating Liquids (y-1) to (y-8) for Forming Coating Film (y')

To the mixed amount shown in Table 2 of the fine particle dispersion liquid (y-0) produced in Production Example y-0, the kinds and the mixed amounts shown in Table 2 of the solution of an acrylic resin, the crosslinking agent, and the diluting solvent were added, so as to prepare coating liquids (y-1) to (y-8) for forming a coating film (y') having the solid concentrations shown in Table 2.

The details of the components shown in Table 2 used for the preparation of the coating liquids (y-1) to (y-8) for forming a coating film (y') are as follows.

Solution of Acrylic Resin

Solution (i): acrylic resin (x-i) (the details thereof are described above)

Crosslinking Agent

Aluminum chelate crosslinking agent: "M-5A", a product name, produced by Soken Chemical & Engineering Co., Ltd., solid concentration: 4.95% by mass Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass Diluting Solvent IPA: isopropyl alcohol IPA/CHN: mixed solvent containing isopropyl alcohol (IPA) and cyclohexanone (CHN) (IPA/CHN=60/40 (mass ratio))

TABLE 2

| | | Fine particle dispersion liquid (y-0) produced in Production Example y-0 (solid concentration: 30 wt %) | | | Solution of acrylic resin | | | | Aluminum chelate crosslinking agent (M-5A, solid concentration: 4.95 wt %) | |
|---|---|---|---|---|---|---|---|---|---|---|
| | Coating liquid for forming coated layer (y') | Mixed amount (part by mass) | Mixed amount of solid content (part by mass) | Content of fine particles (*) (part by mass) | Kind | Kind or resin | Mixed amount (part by mass) | Mixed amount of solid content (part by mass) | Mixed amount (part by mass) | Mixed amount of solid content (part by mass) |
| Production Example y-1 | (y-1) | 69.7 | 20.9 | 12.5 | solution (i) | acrylic resin (x-i) (BA/AA = 90/10 (wt %), Mw: 470,000 | 30.3 | 10.2 | 5.52 | 0.27 |

TABLE 2-continued

| | | | | | | | | | | |
|---|---|---|---|---|---|---|---|---|---|---|
| Production Example y-2 | (y-2) | 61.6 | 18.5 | 11.1 | solution (i) | acrylic resin (x-i) (BA/AA = 90/10 (wt %), Mw: 470,000 | 38.4 | 12.9 | 6.04 | 0.30 |
| Production Example y-3 | (y-3) | 77.6 | 23.3 | 14.0 | solution (i) | acrylic resin (x-i) (BA/AA = 90/10 (wt %), Mw: 470,000 | 22.4 | 7.5 | 5.01 | 0.25 |
| Production Example y-4 | (y-4) | 85.4 | 25.6 | 15.4 | solution (i) | acrylic resin (x-i) (BA/AA = 90/10 (wt %), Mw: 470,000 | 14.6 | 4.9 | 4.51 | 0.22 |
| Production Example y-5 | (y-5) | 71.0 | 21.3 | 12.8 | solution (i) | acrylic resin (x-i) (BA/AA = 90/10 (wt %), Mw: 470,000 | 29.0 | 9.7 | 5.44 | 0.27 |
| Production Example y-6 | (y-6) | 69.7 | 20.9 | 12.5 | solution (i) | acrylic resin (x-i) (BA/AA = 90/10 (wt %), Mw: 470,000 | 30.3 | 10.2 | — | — |
| Production Example y-7 | (y-7) | 71.0 | 21.3 | 12.8 | solution (i) | acrylic resin (x-i) (BA/AA = 90/10 (wt %), Mw: 470,000 | 29.0 | 9.7 | — | — |
| Production Example y-8 | (y-8) | 71.0 | 21.3 | 12.8 | solution (i) | acrylic resin (x-i) (BA/AA = 90/10 (wt %), Mw: 470,000 | 29.0 | 9.7 | 2.72 | 0.13 |

| | Aluminum chelate crosslinking agent (M-5A, solid concentration: 4.95 wt %) | Epoxy crosslinking agent (TETRAD-C, solid concentration: 5 wt %) | | | | | |
|---|---|---|---|---|---|---|---|
| | Solid content per 100 parts by mass of acrylic resin (part by mass) | Mixed amount (part by mass) | Solid content per 100 parts by mass of acrylic resin (part by mass) | Mixed amount of solid content (part by mass) | Diluting solvent Kind | Solid concentration of coating liquid (% by mass) | Concentration of fine particles in solid content of coating liquid (**) (% by mass) |
| Production Example y-1 | 1.47 | — | — | — | IPA | 27 | 40 |
| Production Example y-2 | 1.47 | — | — | — | IPA | 27 | 35 |
| Production Example y-3 | 1.47 | — | — | — | IPA | 27 | 45 |
| Production Example y-4 | 1.47 | — | — | — | IPA | 27 | 50 |
| Production Example y-5 | 1.47 | — | — | — | IPA/CHN | 26 | 41 |
| Production Example y-6 | — | — | — | — | IPA | 27 | 40 |
| Production Example y-7 | — | 0.66 | 0.033 | 0.18 | IPA | 26 | 41 |
| Production Example y-8 | 0.74 | 0.33 | 0.017 | 0.09 | IPA | 26 | 41 |

(*): value calculated from (solid mixed amount) × 50.4/(50.4 + 33.6)
(**): value calculated from (content of fine particles)/((solid mixed amount in fine particle dispersion liquid (y-0)) + (solid mixed amount of acrylic resin) + (solid mixed amount of aluminum chelate crosslinking agent) + (solid mixed amount of epoxy crosslinking agent)) × 100

Examples 1 to 8

(1) Formation of Coating film

A polyethylene terephthalate (PET) film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to the thickness shown in Table 3 as the thickness of the coating film after coating (i.e., the thickness of the coating film in a non-dried state), so as to form a coating film (xβ').

Subsequently, on the coating film (xβ') thus formed, one of the coating liquids (y-1) to (y-4) for forming a coating film (y') of the kinds shown in Table 3 was coated with an applicator to the thickness shown in Table 3 as the total thickness after coating both the two layers, i.e., the coating film (xβ') and a coating film (y') (i.e., the total thickness of the two layers in a non-dried state), so as to form a coating film (y').

Then, on the coating film (y') thus formed, the solution (x-1) of a resin composition prepared in Production Example x-1 was coated with an applicator to the thickness shown in Table 3 as the total thickness after coating all the three layers, i.e., the coating film (xβ'), the coating film (y'), and a coating film (xα') (i.e., the total thickness of the three layers in a non-dried state), so as to form a coating film (xα').

(2) Drying Treatment

The three layers of the coating film (xβ'), the coating film (y'), and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 3.

Example 9

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-2) of a resin composition prepared in Production Example x-2 was coated with a knife coater to a thickness of 25 μm as the thickness of the coating film after coating (i.e., the thickness of the coating film in a non-dried state), so as to form a coating film (xβ'), which was then dried at a drying temperature of 100° C. for 2 minutes, so as to form a layer (Xβ) containing a resin part (X).

Lamination was performed in such a manner that the surface of the layer (Xβ) thus formed was attached to a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated with a multilayer die coater (width: 500 mm), so as to form a coating film (y') and a coating film (xα') simultaneously in this order on the layer (Xβ). The coated layers were formed to a thickness of 55 μm for the coating film (y') and a thickness of 65 μm for the coating film (xα') through the setting of the multilayer die coater.

Then, the two layers of the coating film (y') and the coating film (xα1) were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 3.

Comparative Example 1

A pressure sensitive adhesive sheet with a substrate, having a resin layer containing only a resin part (X) having a thickness of 25 μm was produced in the same manner as in Example 1, except that the coating film (y') and the coating film (xα') in Example 1 were not formed, but on the aluminum vapor deposition layer of the PET film used as the substrate, the solution (x-1) of a resin composition prepared in Production Example x-1 was coated with a knife coater to a thickness of 25 μm after drying to form a coating film (xβ').

Comparative Example 2

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to form a coating film (xβ'), which was then dried at 100° C. for 2 minutes, so as to form a layer (Xβ) containing a resin part (X) having a thickness of 5 μm.

Separately from the above, on a release agent layer of a release film ("SP-PET381031", a product name, produced by Lintec Corporation, a PET film having a silicone release agent layer provided on one surface thereof, thickness: 38 μm), the coating liquid (y-1) for forming a coating film (y') prepared in Production Example y-1 was coated with an applicator to form a coated layer (y'), which was then dried at 100° C. for 2 minutes, so as to form a layer (Y1) containing a resin part (X) and a particle part (Y) having a thickness of 15 μm.

Further separately from the above, on a release agent layer of a release film of the same kind as above, the solution (x-1) of a resin composition prepared in Production Example x-1 was coated with an applicator to form a coating film (xα'), which was then dried at 100° C. for 2 minutes, so as to form a layer (Xα) containing a resin part (X) having a thickness of 5

Then, lamination was performed in such a manner that the surface of the layer (Xβ) formed on the PET film as the substrate was attached to the exposed surface of the layer (Y1) thus formed. Furthermore, lamination was performed in such a manner that the surface of the layer (Y1) having been exposed by removing the release film on the layer (Y1) was attached to the exposed surface of the layer (Xα) thus formed.

According to the procedures, a pressure sensitive adhesive sheet with a substrate, having a resin layer containing a resin part (X) and a particle part (Y) having a thickness of 25 μm, containing the substrate having laminated in this order thereon the layer (Xβ), the layer (Y1), and the layer (Xα) was produced.

Examples 10 to 16

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, one of the solutions (x-1) to (x-6) of a resin composition prepared in Production Examples x-1 to x-6 and one of the coating liquids (y-1) to (y-8) for forming a coating film (y') prepared in Production Examples y-1 to y-8 were simultaneously coated with a multilayer die coater (width: 250 mm) at the flow rate and the coating speed shown in Table 4, so as to form a coating film (xβ'), a coating film (y'), and a coating film (xα') simultaneously in this order from the side of the substrate.

The kind of the solution of the resin composition and the kind of the coating liquid for forming a coated layer (y') used as formation materials of the coating films are shown in Table 4.

The three layers of the coating film (xβ'), the coating film (y'), and the coating film (xα1) were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 4.

Example 17

On a release agent layer of a release film ("SP-PET381031", a product name, produced by Lintec Corporation, a PET film having a silicone release agent layer provided on one surface thereof, thickness: 38 μm) as a first release material, the solution (x-3) of a resin composition prepared in Production Example x-3, the coating liquid (y-5) for forming a coating film (y') prepared in Production Example y-5, and the solution (x-3) of a resin composition prepared in Production Example x-3 were simultaneously coated in this order with a multilayer die coater (width: 250 mm) at the flow rate and the coating speed shown in Table 4, so as to form a coating film (xβ'), a coating film (y'), and a coating film (xα') simultaneously in this order from the side of the release film.

Then, the three layers of the coating film (xβ'), the coating film (y'), and the coating film (xα') were simultaneously dried at a drying temperature of 100° C. for 2 minutes, so as to form a resin layer containing a resin part (X) and a particle part (Y) having the thickness shown in Table 4. Then, lamination was performed in such a manner that the surface (α) of the resin layer thus formed was attached to a surface of a release agent layer of a release film ("SP-PET386040", a product name, produced by Lintec Corporation) as a second release material, thereby producing a pressure sensitive adhesive sheet without a substrate.

Subsequently, after allowing to stand the pressure sensitive adhesive sheet without a substrate under an environment at 23° C. for one week, the first release material was removed, and lamination was performed in such a manner that the exposed surface (β) of the resin layer was attached to a surface of an aluminum vapor deposition layer of a PET film having an aluminum vapor deposition layer ("FNS MAT N50", a product name, produced by Lintec Corporation, thickness: 50 μm) as a substrate, thereby providing a pressure sensitive adhesive sheet with a substrate.

Example 18

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with a knife coater to form a coating film (xβ'), which was then dried at 100° C. for 2 minutes, so as to form a layer (Xβ) containing a resin part (X) having a thickness of 8 μm. Lamination was performed in such a manner that the surface of the layer (Xβ) thus formed was attached to a surface of a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated in this order with a multilayer die coater (width: 500 mm) at the flow rate and the coating speed shown in Table 4, so as to form a coating film (y') and a coating film (xα') simultaneously in this order from the side of the layer (Xβ).

Then, the two layers of the coating film (y') and the coating film (xα') were simultaneously dried at a drying temperature of 100° C. for 2 minutes, thereby producing a pressure sensitive adhesive sheet with a substrate, having a resin layer containing a resin part (X) and a particle part (Y) having the thickness shown in Table 4.

The resin layer of each pressure sensitive adhesive sheet was analyzed to observe or measure the shape of the concave portions (G) on the surface (α), the maximum height difference of the concave portions (g) on the surface (α), the areal ratio of the attached portion in the surface (α), and the mass retention rate of the resin layer, according to the methods mentioned below. The results are shown in Table 3 and Table 4.

<Shapes of One or More Concave Portion (G) on Surface (α)>

A configuration of FIG. 1 was drawn according to the following operation (i).

Operation (i): As shown in FIG. 1, the pressure sensitive adhesive sheet produced in Examples and Comparative Examples was statically put on the smooth surface 100a of a light transmissive adherend 100, in such a manner that the surface (α) 12a of the resin layer 12 of the pressure sensitive adhesive sheet could be in contact with the smooth surface 100a. With that, on the side of the substrate 11 of the pressure sensitive adhesive sheet, a 2-kg roller (JIS Z 0237:2000 10.2.4) was run by 5 reciprocating motions to thereby adhere the surface (α) of the resin layer 12 and the smooth surface 100a of the light transmissive adherend 100. Accordingly, a laminate as arranged in the direction shown in FIG. 1 was obtained.

Operation (ii): Ten regions (R) each surrounded by a square having an edge length of 4 mm were arbitrarily selected on the surface (α) of the resin layer on the side of the light transmissive adherend 100 of the laminate obtained in the operation (i), and analyzed for the planar shape of the concave portions (G) on the surface (α) (as to whether or not they could have an irregular shape), the number of the concave portions (as to whether or not they could be plural concave portions), the irregularity of the concave portions and the periodicity of the concave portions, according to the methods for judgement defined in the present invention, visually or on a digital image taken via a digital microscope (trade name, "Digital Microscope VHX-5000" manufactured by Keyence Corporation, magnification: 50).

<Areal Ratio of Attached Portion>

In the pressure sensitive adhesive sheet attached with the smooth surface 100a of the light transmissive adherend 100 of the laminate obtained in the operation (i) for the shape of the concave portions (G) on the surface (α), the areal ratio of the attached portion was calculated according to the following operation (ii) and operation (iii).

Operation (ii): In the region (Q) surrounded by a square having an edge length of 1 mm as arbitrarily selected on the surface (α) 12a on the side of the light transmissive adherend 100 of the laminate, the interface between the smooth surface 100a of the light transmissive adherend 100 and the surface (α) 12a of the resin layer was photographed in the direction Win FIG. 1, using a digital microscope (trade name, "Digital Microscope VHX-1000" manufactured by Keyence Corporation), thereby giving a digital image of the region (Q).

Operation (iii): Using image analysis software (trade name "Image-Pro Plus" manufactured by Media Cybernetics Corporation), the resultant digital image was processed (binarization) to give a binarized image, as shown in FIG. 4. With that, on the binarized image, the area S of the attached portion 101 that was in contact with the smooth surface 100a of the light transmissive adherend 100 in the region was determined. Next, based on a math formula "[areal ratio (%) of attached portion]=(S/(area of the region))×100", the areal ratio of the attached portion to the light transmissive adherend in the selected region was calculated.

<Maximum Height Difference of Concave Portions (g) on Surface (α)>

The surface (α) of the resin layer of the pressure sensitive adhesive sheet produced in Examples and Comparative Examples before a light transmissive adherend having a smooth surface was attached thereto was analyzed for the concave portions (g) thereon, using a scanning electron microscope (trade name "S-4700" manufactured by Hitachi Limited); magnification power, 30 times). Among the height differences of the plural concave portions (g), the maximum value was referred to as "maximum height difference".

Mass Retention Rate of Resin Layer of Pressure Sensitive Adhesive Sheet

For Examples and Comparative Examples except for Example 17, the resin layer was formed according to the method of the Examples and Comparative Examples on the surface of the release agent layer of a release film ("SP-PET381031", a product name, produced by Lintec Corporation, a PET film having a silicone release agent layer provided on one surface thereof, thickness: 38 μm) instead of the substrate, and then the release film was removed, so as to provide a sole resin layer.

For Example 17, the two release films were removed from the pressure sensitive adhesive sheet without a substrate obtained in the course of the production, so as to provide a sole resin layer.

The resin layer before heating was measured for the mass thereof, and then heated to 800° C. for 30 minutes in a muffle furnace ("KDF-P90", a product name, produced by Denken Co., Ltd.). The resin layer after heating was measured for the mass thereof, and the mass retention rate of the resin layer was calculated by the following expression.

mass retention rate of resin layer (%)=((mass of resin layer after heating)/(mass of resin layer before heating))×100

The pressure sensitive adhesive sheets produced in Examples and Comparative Examples were measured or evaluated for the "air escape property", the "blister resistance", and the "adhesive strength" according to the following methods. The results are shown in Tables 3 and 4.

Air Escape Property

The pressure sensitive adhesive sheet in a size of 50 mm in length and 50 mm in width was attached to a melamine-coated plate as an adherend in a manner forming air accumulation. The presence of absence of the air accumulation after press-attaching with a squeegee was observed, and the air escape property of the pressure sensitive adhesive sheets was evaluated based on the following standard.

A: The air accumulation disappeared, and excellent air escape property was obtained.

F: The air accumulation remained, and poor air escape property was obtained.

Blister Resistance

The pressure sensitive adhesive sheet in a size of 50 mm in length and 50 mm in width was attached to a polymethyl methacrylate plate having a size of 70 mm in length, 150 mm in width, and 2 mm in thickness ("Acrylite L001", produced by Mitsubishi Rayon Co., Ltd.), followed by press-attaching with a squeegee, so as to provide a test specimen.

The test specimen was allowed to stand at 23° C. for 12 hours, then allowed to stand in a hot air dryer at 80° C. for 1.5 hours, further allowed to stand in a hot air dryer at 90° C. for 1.5 hours, and then visible to the naked eyes for the occurrence state of blister after the heat acceleration, and the blister resistance of the pressure sensitive adhesive sheets was evaluated based on the following standard.

A: Completely no blister was observed.

B: Blister was partially observed.

C: Blister was observed over the surface.

Adhesive Strength

The pressure sensitive adhesive sheets produced in Examples and Comparative Examples were cut into a size of 25 mm in length and 300 mm in width, and the surface (α) of the resin layer of the pressure sensitive adhesive sheets was attached to a stainless steel plate (SUS304, polished with #360 polishing paper) under an environment of 23° C., 50% RH (relative humidity), followed by allowing to stand in the same environment for 24 hours. After standing, the adhesive strength of the pressure sensitive adhesive sheets was measured according to JIS Z0237:2000 by the 180° peeling method at a peeling speed of 300 mm/min.

TABLE 3

| | Thickness of Coating film (μm) | | | Coating film (xβ' + y' + xα') | Coating film (xβ') Kind of solution | Kind of coating liquid | Particle concentration in coating film (y') (% by mass) | Coating film (xα') Kind of solution | Resin layer Thickness (μm) | Shapes of one or more concave portions (G) on surface (α) number of concave portions | planar shape |
|---|---|---|---|---|---|---|---|---|---|---|---|
| | Coating film (xβ') | Coating film (xβ' + y') | | | | | | | | | |
| Example 1 | 25 | 75 | 100 | (x-1) | (y-1) | 40 | (x-1) | 25.7 | multiple | irregular |
| Example 2 | 12.5 | 75 | 100 | (x-1) | (y-1) | 40 | (x-1) | 25.1 | multiple | irregular |
| Example 3 | 25 | 50 | 100 | (x-1) | (y-1) | 40 | (x-1) | 23.9 | multiple | irregular |
| Example 4 | 25 | 200 | 250 | (x-1) | (y-1) | 40 | (x-1) | 43.1 | multiple | irregular |
| Example 5 | 25 | 75 | 100 | (x-1) | (y-2) | 35 | (x-1) | 23.8 | multiple | irregular |
| Example 6 | 25 | 75 | 100 | (x-1) | (y-3) | 45 | (x-1) | 30.1 | multiple | irregular |
| Example 7 | 25 | 75 | 100 | (x-1) | (y-4) | 50 | (x-1) | 32.3 | multiple | irregular |
| Example 8 | 25 | 200 | 250 | (x-1) | (y-2) | 35 | (x-1) | 41.0 | multiple | irregular |
| Example 9 | 25 | 80(*1) | 145(*1) | (x-2) | (y-1) | 40 | (x-1) | 42.0 | multiple | irregular |
| Comparative Example 1 | 25(*2) | — | — | (x-1) | — | 0 | — | 25.0 | no | — |
| Comparative Example 2 | 5(*2) | 20(*2) | 25(*2) | (x-1) | (y-1) | 40 | (x-1) | 25.0 | no | — |

TABLE 3-continued

| | | Resin layer | | | | Pressure sensitive adhesive sheet evaluation Items | | |
|---|---|---|---|---|---|---|---|---|
| | | Shapes of one or more concave portions (G) on surface (α) | | Areal ratio of attached portion in surface (α) (%) | Maximum height difference of concave portions (g) (μm) | Mass retention rate of resin layer (% by mass) | | |
| | Irregularity | presence or absence of periodicity | | | | | Air escape property | Blister resistance | Adhesive strength (N/25 mm) |
| Example 1 | irregular | absent | 59.9 | 15.7 | 16.9 | A | A | 8.6 |
| Example 2 | irregular | absent | 54.3 | 17.3 | 20.0 | A | A | 12.7 |
| Example 3 | irregular | absent | 61.6 | 7.6 | 9.5 | A | A | 11.7 |
| Example 4 | irregular | absent | 41.8 | 42.4 | 28.1 | A | A | 7.8 |
| Example 5 | irregular | absent | 71.7 | 6.6 | 15.0 | A | A | 9.4 |
| Example 6 | irregular | absent | 55.2 | 26.3 | 20.9 | A | A | 10.1 |
| Example 7 | irregular | absent | 54.3 | 30.8 | 23.1 | A | A | 10.8 |
| Example 8 | irregular | absent | 89.8 | 3.5 | 21.3 | A | A | 12.4 |
| Example 9 | irregular | absent | 47.7 | 18.5 | 15.1 | A | A | 10.2 |
| Comparative Example 1 | — | — | 100.0 | — | 0.0 | F | C | 18.0 |
| Comparative Example 2 | — | — | 100.0 | — | 17.0 | F | A | 15.0 |

(*1)This is not a measured value but is a thickness of the coating film settled in a multilayer die coater.
(*2)This is a thickness of the coating film after dried.

TABLE 4

| | Coating speed (m/min) | Flow rate of solution (Coating liquid) (g/min) | | | Coating film (xβ') Kind of Solution | Coating film Kind of coating liquid | Particle concentration in coating film (y') (% by mass) | Coating film (xα') Kind of solution | Thickness (μm) | Resin layer | | |
|---|---|---|---|---|---|---|---|---|---|---|---|---|
| | | Coating Film (xβ') | Coating Film (y') | Coating Film (xα') | | | | | | Shapes of one or more concave portions (G) on surface (α) | | |
| | | | | | | | | | | Number of concave portions | Planar shape | |
| Example 10 | 3.0 | 27 | 27 | 27 | (x-1) | (y-1) | 40 | (x-1) | 30.0 | multiple | irregular | |
| Example 11 | 3.0 | 27 | 21 | 27 | (x-1) | (y-1) | 40 | (x-1) | 26.7 | multiple | irregular | |
| Example 12 | 3.0 | 27 | 9 | 27 | (x-1) | (y-1) | 40 | (x-1) | 23.3 | multiple | irregular | |
| Example 13 | 3.0 | 27 | 51 | 54 | (x-3) | (y-5) | 41 | (x-3) | 51.0 | multiple | irregular | |
| Example 14 | 3.0 | 27 | 27 | 27 | (x-4) | (y-6) | 40 | (x-4) | 29.6 | multiple | irregular | |
| Example 15 | 3.0 | 27 | 27 | 27 | (x-4) | (y-7) | 40 | (x-4) | 29.2 | multiple | irregular | |
| Example 16 | 3.0 | 27 | 27 | 27 | (x-5) | (y-8) | 40 | (x-6) | 29.5 | multiple | irregular | |
| Example 17 | 3.0 | 27 | 51 | 54 | (x-3) | (y-5) | 41 | (x-3) | 51.0 | multiple | irregular | |
| Example 18 | 5.0 | 27 (8 μm)(*4) | 133 | 161 | (x-1) | (y-1) | 40 | (x-1) | 42.0 | multiple | irregular | |

| | Resin layer | | | | | Pressure sensitive adhesive sheet evaluation Items | | |
|---|---|---|---|---|---|---|---|---|
| | Shapes of one or more concave portions (G) on surface (α) | | Areal ratio of attached portion in surface (α) (%) | Maximum height difference on surface (α) (μm) | Mass retention rate of resin layer (% by mass) | Air escape property | Blister resistance | Adhesive strength (N/25 mm) |
| | Irregularity | Presence or absence of periodicity | | | | | | |
| Example 10 | irregular | absent | 36.9 | 20.3 | 8.6 | A | A | 8.8 |
| Example 11 | irregular | absent | 40.2 | 15.0 | 7.1 | A | A | 10.8 |
| Example 12 | irregular | absent | 67.7 | 10.6 | 5.8 | A | A | 13.3 |
| Example 13 | irregular | absent | 59.2 | 42.5 | 12.6 | A | A | 23.5 |
| Example 14 | irregular | absent | 45.2 | 19.5 | 8.4 | A | A | 10.3 |
| Example 15 | irregular | absent | 48.0 | 19.2 | 8.2 | A | A | 11.6 |
| Example 16 | irregular | absent | 40.2 | 17.7 | 8.0 | A | A | 9.8 |
| Example 17 | irregular | absent | 60.0 | 41.0 | 12.6 | A | A | 24.0 |
| Example 18 | irregular | absent | 47.7 | 18.5 | 15.1 | A | A | 10.2 |

(*4)This is a thickness of the coating film (xβ') after dried.

From Table 3 and Table 4, it is confirmed that, when a smooth surface of a light transmissive adherend having a smooth surface was attached to the surface (α) of the pressure sensitive adhesive sheet produced in Examples 1 to 18, these pressure sensitive adhesive sheets had concave portions (G) not in contact with the smooth surface on the surface (α), and the concave portions (G) had irregular shapes, and accordingly, these pressure sensitive adhesive sheets had good air escape property, blister resistance and adhesive strength. In visual observation, the concave portions (G) had irregular shapes and the shape of the attached face also had an irregular shape.

Figure 6:
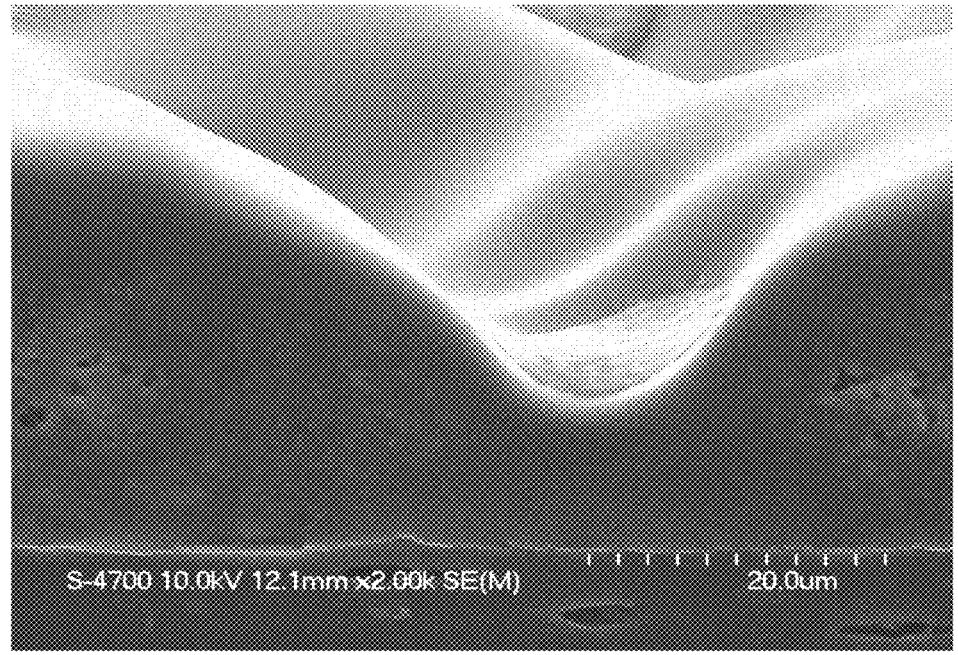
FIG. 6 is images of the pressure sensitive adhesive sheet produced in Example 1 before a smooth surface of a light transmissive adherend having a smooth surface is attached to a surface (α) of the resin layer of the adhesive sheet, as taken through a scanning electron microscope; and (a) of FIG. 6 is an image of a cross section of the pressure sensitive adhesive sheet, and (b) of FIG. 6 is a perspective image of the surface (α) of the resin layer of the pressure sensitive adhesive sheet, as taken from the side of the surface (α).
Figure 6:
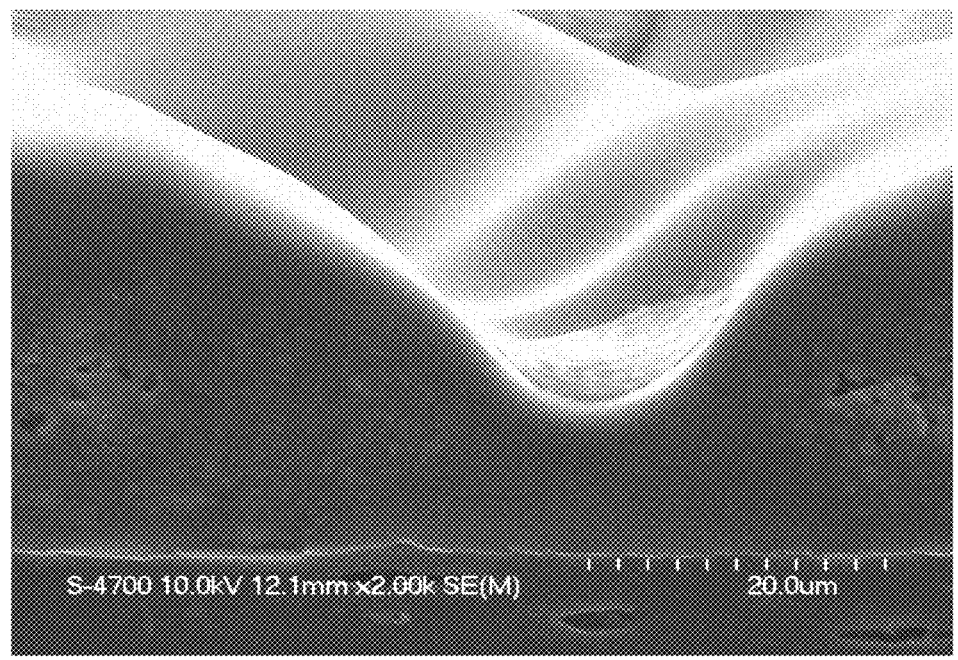
Figure 7:
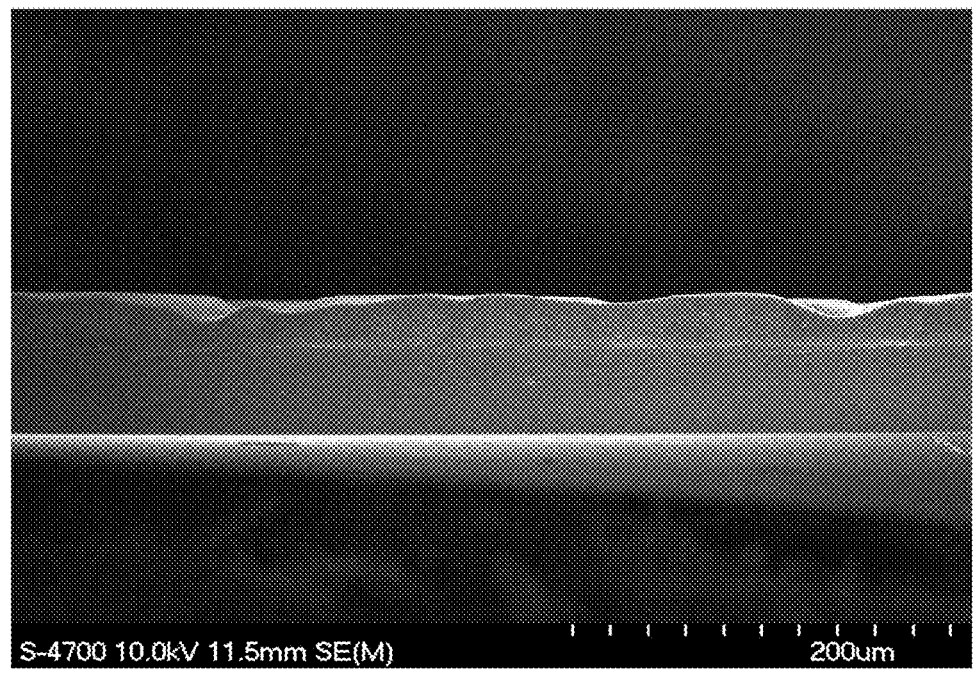
FIG. 7 is images of the pressure sensitive adhesive sheet produced in Example 10 before a smooth surface of a light transmissive adherend having a smooth surface is attached to a surface (α) of the resin layer of the adhesive sheet, as taken through a scanning electron microscope; and (a) of FIG. 7 is an image of a cross section of the pressure sensitive adhesive sheet, and (b) of FIG. 7 is a perspective image of the surface (α) of the resin layer of the pressure sensitive adhesive sheet, as taken from the side of the surface (α).
Figure 7:
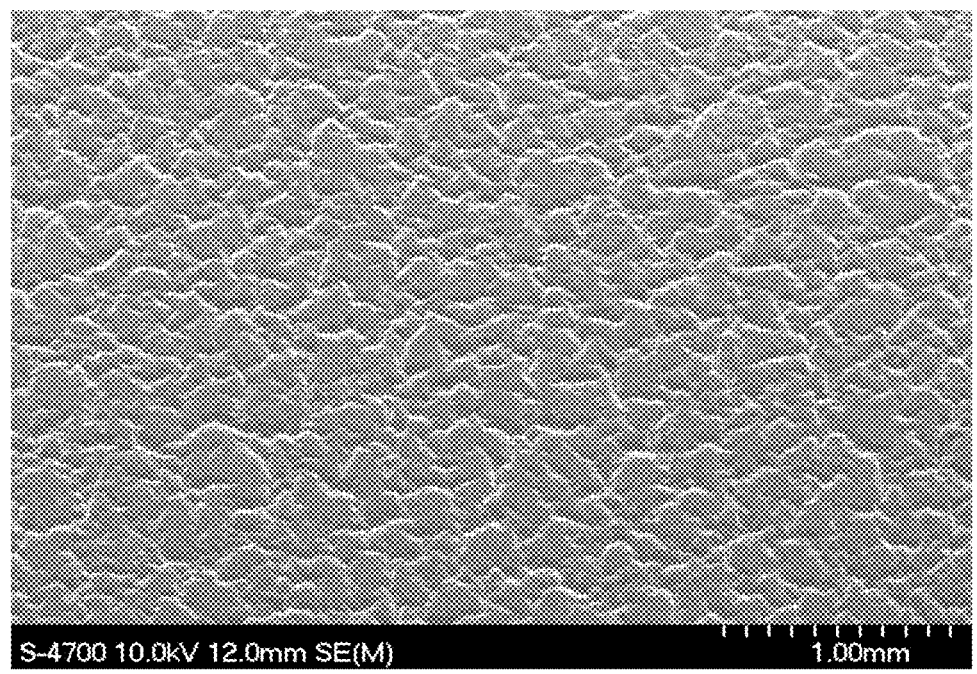
Figure 10:
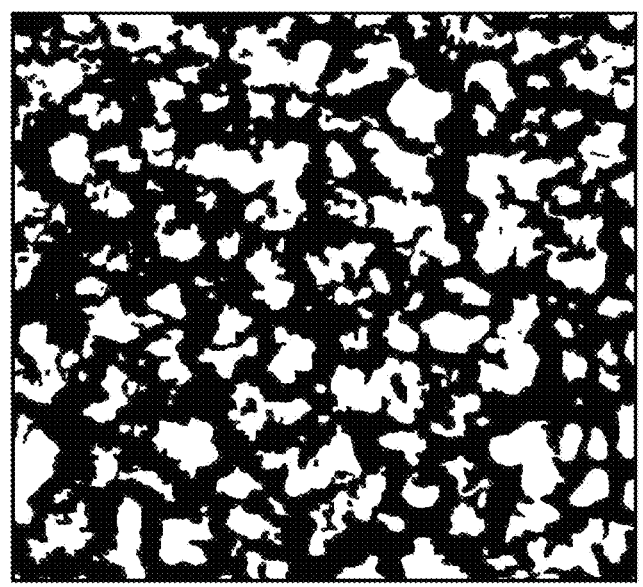
FIG. 10 is a binary image obtained in such a manner that the surface (α) of the resin layer of the pressure sensitive adhesive sheet produced in Example 10 is attached to a smooth surface of a light transmissive adherend, a digital image is obtained by observing the surface (α) from the side of the light transmissive adherend, and a region surrounded by a square having an edge length of 2 mm that is arbitrarily selected on the digital image is subjected to an image processing (binary processing).

FIG. 6 and FIG. 7 each include images of the pressure sensitive adhesive sheet produced in Example 1 and Example 10, respectively, taken through a scanning electron microscope before a smooth surface of a light transmissive adherend was attached to the surface (α) of the resin layer of the pressure sensitive adhesive sheet; and (a) is an image of a cross section of the pressure sensitive adhesive sheet, and (b) is a perspective image of the surface (α) of the resin layer of the pressure sensitive adhesive sheet. In the image of FIG. 6(a), 10 scale marks given at the bottom right of the image indicate a length of 20.0 μm, and in the image of FIG. 7(a), 10 scale marks given at the bottom right of the image indicate a length of 200 μm. In the images of FIG. 6(b) and FIG. 7(b), 10 scale marks indicate a length 1.00 mm.

From the images of FIG. 6 and FIG. 7, it is known that concave portions were formed on the surface (α) of the resin layer of the pressure sensitive adhesive sheet produced in Examples 1 and 10, and the pressure sensitive adhesive sheets produced in the other Examples also gave the same images as in FIG. 6 and FIG. 7.

On the other hand, formation of any specific concave portions could not be recognized on the surface of the resin layer that the pressure sensitive adhesive sheet produced in Comparative Examples 1 and 2 has, and the air escape property of these pressure sensitive adhesive sheets was poor. In addition, the pressure sensitive adhesive sheet of Comparative Example 1 was also poor in blister resistance.

Figure 8:
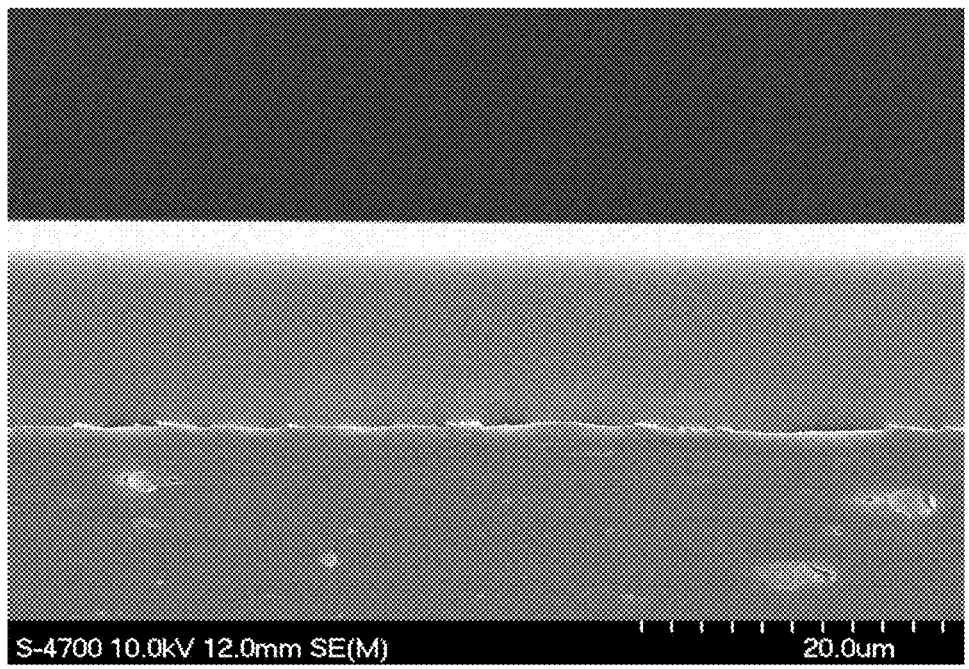
FIG. 8 is images of the pressure sensitive adhesive sheet produced in Comparative Example 1 before a smooth surface of a light transmissive adherend having a smooth surface is attached to a surface (α) of the resin layer of the adhesive sheet, as taken through a scanning electron microscope; and (a) of FIG. 8 is an image of a cross section of the pressure sensitive adhesive sheet, and (b) of FIG. 8 is a perspective image of the surface (α) of the resin layer of the pressure sensitive adhesive sheet, as taken from the side of the surface (α).
Figure 8:
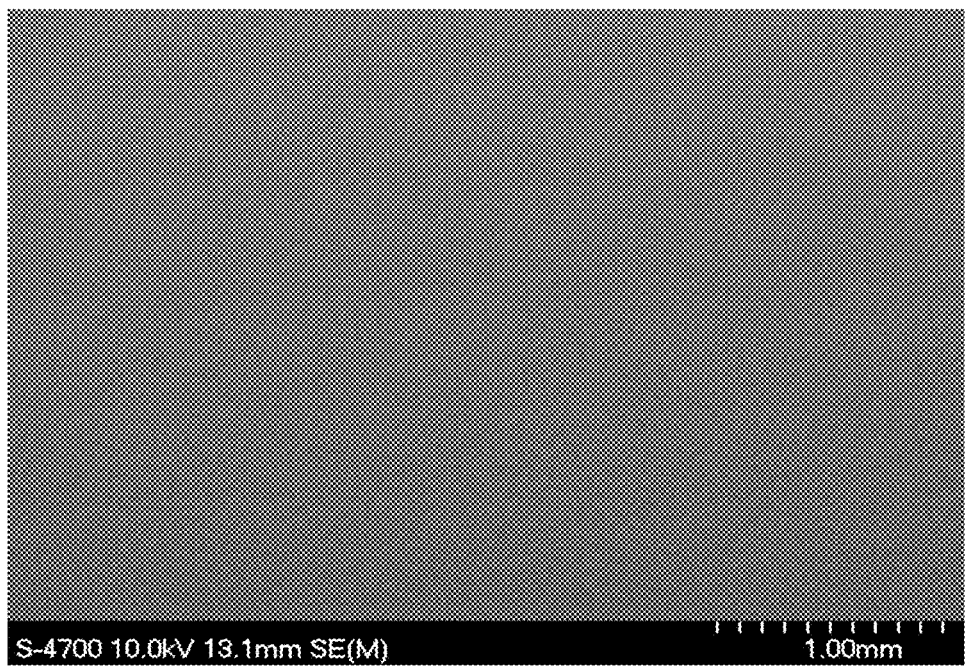

FIG. 8 includes images of the pressure sensitive adhesive sheet produced in Comparative Example 1, taken through a scanning electron microscope; and (a) is an image of a cross section of the pressure sensitive adhesive sheet, and (b) is a perspective image of the surface (α) of the resin layer of the pressure sensitive adhesive sheet. In the image of FIG. 8(a), 10 scale marks indicate a length of 20.0 μm, and in the image of FIG. 8(b), 10 scale marks indicate a length of 1.00 mm.

As shown in FIG. 8, formation of concave portions was not seen on the surface (α) of the resin layer of the pressure sensitive adhesive sheet produced in Comparative Example 1.

Figure 9:
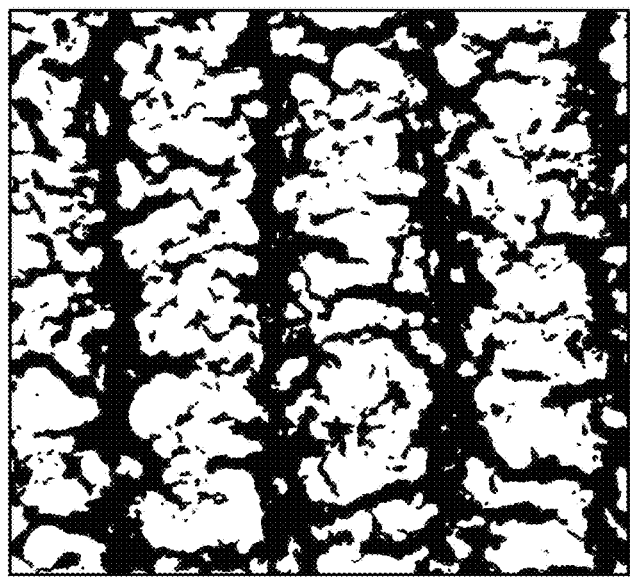
FIG. 9 is a binary image obtained in such a manner that the surface (α) of the resin layer of the pressure sensitive adhesive sheet produced in Example 1 is attached to a smooth surface of a light transmissive adherend, a digital image is obtained by observing the surface (α) from the side of the light transmissive adherend, and a region surrounded by a square having an edge length of 2 mm that is arbitrarily selected on the digital image is subjected to an image processing (binary processing).
Figure 11:
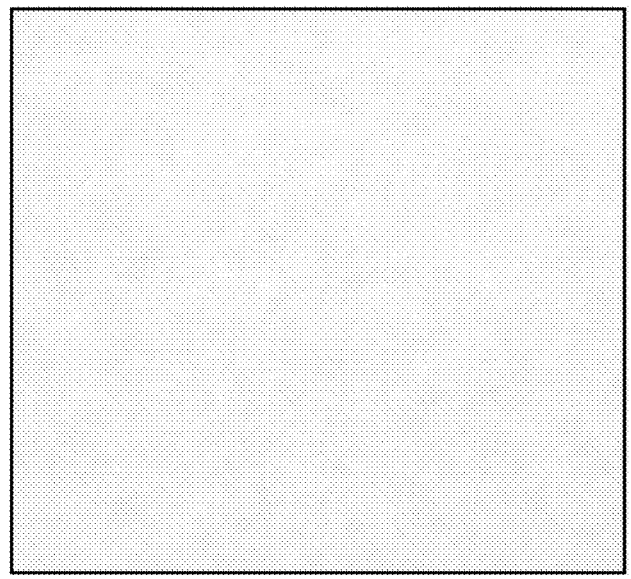
FIG. 11 is a binary image obtained in such a manner that the surface (α) of the resin layer of the pressure sensitive adhesive sheet produced in Comparative Example 1 is attached to a smooth surface of a light transmissive adherend, a digital image is obtained by observing the surface (α) from the side of the light transmissive adherend, and a region surrounded by a square having an edge length of 2 mm that is arbitrarily selected on the digital image is subjected to an image processing (binary processing).

FIGS. 9, 10 and 11 each are a binarized image obtained by image processing (image binarization), for which the surface (α) of the resin layer of the pressure sensitive adhesive sheet produced in any of Example 1, Example 10 and Comparative Example 1, respectively, is attached to a smooth surface of a light transmissive adherend having a smooth surface, the surface (α) is observed from the side of the light transmissive adherend to take a digital image thereof, and a region surrounded by an arbitrarily selected square having an edge length of 2 mm on the digital image is image-processed (image-binarized).

The operations to take the binarized image are the same as the operations (i) to (iii) for the item "areal ratio of the attached portion".

In the images of FIGS. 9 to 11, the outer frame shows a square having an edge length of 2 mm. In the binarized images of FIG. 9 to FIG. 11, the white portion indicates the attached portion and the black portion indicates the non-attached portion.

In the pressure sensitive adhesive sheet of Comparative Example 1, any concave portions were not formed on the surface (α) of the resin layer, and accordingly, the whole area of the surface (α) is an attached portion, therefore presenting the binarized image of FIG. 11.

INDUSTRIAL APPLICABILITY

One embodiment of the pressure sensitive adhesive sheet of the present invention is useful as a pressure sensitive adhesive sheet having a large adhesive area that is used for identification or decoration, for masking in coating, and for surface protection for metal plates, etc.

REFERENCE SIGN LIST 1a, 1b, 2a, 2b Pressure sensitive Adhesive Sheet
11 Substrate
12 Resin Layer
12a Surface (α)
12b Surface (β)
13 Concave portion (G)
13' Concave portion (g)
(X) Resin Part (X)
(Y) Particle Part (Y)
(Xβ) Layer (Xβ) mainly containing the resin part (X)
(Xα) Layer (Xα) mainly containing the resin part (X)
(Y1) Layer (Y1) containing the particle part (Y)
14, 14a Release Material
50 Square having an edge length of 1 mm
100 Light transmissive Adhesive
100a Smooth Surface
101 Attached Portion to Smooth Surface of Light transmissive Adherend

The invention claimed is:

1. A pressure sensitive adhesive sheet, comprising:
a substrate or a release material,
a resin layer on the substrate or the release material, the resin layer having at least a surface (α) having pressure sensitive adhesiveness on a side opposite to the side on which the substrate or the release material is provided,
wherein the surface (α) has at least one concave portion (G) having irregular shapes such that, when a smooth surface of a light transmissive adherend having the smooth surface is attached to the surface (α), the concave portion (G) does not contact the smooth surface of the light transmissive adhererend,
the resin layer comprises a resin and fine particles having a mean particle size of 0.01 to 100 μm, and
the fine particles are selected from the group consisting of silica particles having a mass concentration of silica of 85 to 100% by mass, metal oxide particles, and smectite.

2. The pressure sensitive adhesive sheet according to claim 1, wherein the at least one concave portion (G) is formed through self-formation of the resin layer.

3. The pressure sensitive adhesive sheet according to claim 1, wherein the at least one concave portion (G) is formed such that, when the smooth surface is attached to the surface (α), a ratio of an area of an attached face of the surface (α) that is in contact with the smooth surface to a total area of the surface (α) is 10 to 95%.

4. The pressure sensitive adhesive sheet according to claim 1, wherein the irregular shapes of the concave portion (G) are capable of being visually confirmed.

5. The pressure sensitive adhesive sheet according to claim 1, wherein the surface (α) has a plurality of the concave portions (G).

6. The pressure sensitive adhesive sheet according to claim 5, wherein positions of the plurality of concave portions (G) have no periodicity.

7. The pressure sensitive adhesive sheet according to claim 1, wherein the at least one concave portion (G) exists irregularly on the surface ($\alpha$).

8. The pressure sensitive adhesive sheet according to claim 1, wherein the at least one concave portion (G) is formed such that, when the smooth surface is attached to the surface ($\alpha$), an attached face of the surface ($\alpha$) that is in contact with the smooth surface has an irregular shape.

9. The pressure sensitive adhesive sheet according to claim 1, wherein the resin layer comprises a resin part (X) comprising the resin as a main component and a particle part (Y) consisting of the fine particles.

10. The pressure sensitive adhesive sheet according to claim 9, wherein the resin part (X) further comprises at least one crosslinking agent selected from the group consisting of an epoxy crosslinking agent, an aziridine crosslinking agent and a metal chelate crosslinking agent.

11. The pressure sensitive adhesive sheet according to claim 9, wherein the resin layer has a multi-layer structure comprising:
a layer (X$\beta$) mainly comprising the resin part (X);
a layer (Y1) comprising the particle part (Y) in an amount of 15% by mass or more; and
a layer (X$\alpha$) mainly comprising the resin part (X),
laminated in an order of the layer (X$\beta$), layer (Y1), and the layer (X$\alpha$) from the side on which the substrate or the release material is provided.

12. The pressure sensitive adhesive sheet according to claim 11, wherein:
the layer (x$\beta$) is formed by a composition (x$\beta$) comprising the resin as a main component,
the layer (Y1) is formed by a composition (y) comprising the fine particles in an amount of 15% by mass or more, and
the layer (X$\beta$) is a layer formed by a composition (x$\alpha$) comprising the resin as a main component.

13. The method for producing a pressure sensitive adhesive sheet according to claim 12, the method comprising:
(i) forming, on the substrate or the release material, a coating film (x$\beta$') of the composition (x$\beta$) comprising the resin as a main component, a coating film (y') of the composition (y) comprising the fine particles in an amount of 15% by mass or more on the coating film (x$\beta$'), and a coating film (x$\alpha$') of the composition (x$\alpha$) comprising the resin as a main component on the coating film (y'), by laminating; and
(ii) drying the coating film (x$\beta$'), the coating film (y') and the coating film (x$\alpha$') simultaneously.

14. The method for producing a pressure sensitive adhesive sheet according to claim 12, the method comprising:
forming, on the layer (X$\beta$) mainly comprising a resin part (X) that is provided on the substrate or the release material, a coating film (y') of the composition (y) comprising the fine particles in an amount of 15% by mass or more and a coating film (x$\alpha$') of the composition (x$\alpha$) comprising the resin as a main component on the coating film (y'), by laminating; and
(ii) drying the coating film (y') and the coating film (x$\alpha$') simultaneously.

15. The method for producing a pressure sensitive adhesive sheet according to claim 1, the method comprising:
(i) forming a coating film (x') of a composition (x) comprising the resin as a main component, and a coating film (y') of a composition (y) comprising the fine particles in an amount of 15% by mass or more; and
(ii) drying the coating film (x') and the coating film (y') simultaneously.

16. The pressure sensitive adhesive sheet according to claim 1, wherein the fine particles comprise silica particles having a mass concentration of silica of 85 to 100% by mass.

17. The pressure sensitive adhesive sheet according to claim 16, wherein the silica particles have a volume-average secondary particle diameter of 0.5 to 10 µm.

18. The pressure sensitive adhesive sheet according to claim 1, wherein the resin comprises an acrylic resin.

19. The pressure sensitive adhesive sheet according to claim 1, wherein the fine particles have a mean particle size of 0.05 to 25 µm.

20. The pressure sensitive adhesive sheet according to claim 1, wherein the fine particles are included in the resin layer in an amount of from 3 to 90% by mass.

\* \* \* \* \*